United States Patent
Repasky

(10) Patent No.: US 9,028,720 B1
(45) Date of Patent: May 12, 2015

(54) ION TRANSPORT MEMBRANE REACTOR SYSTEMS AND METHODS FOR PRODUCING SYNTHESIS GAS

(71) Applicant: Air Products and Chemicals, Inc., Allentown, PA (US)

(72) Inventor: John Michael Repasky, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/197,546

(22) Filed: Mar. 5, 2014

(51) Int. Cl.
*C01B 3/38* (2006.01)

(52) U.S. Cl.
CPC ......... *C01B 3/386* (2013.01); *C01B 2203/0261* (2013.01); *C01B 2203/02* (2013.01); *C01B 2203/0216* (2013.01); *C01B 3/382* (2013.01)

(58) Field of Classification Search
USPC ....................................................... 252/373
See application file for complete search history.

(56) References Cited

U.S. PATENT DOCUMENTS

| | | |
|---|---|---|
| 5,820,655 A | 10/1998 | Gottzmann et al. |
| 6,010,614 A | 1/2000 | Keskar et al. |
| 6,048,472 A | 4/2000 | Nataraj et al. |
| 6,077,323 A | 6/2000 | Nataraj et al. |
| 6,110,979 A | 8/2000 | Nataraj et al. |
| 6,114,400 A | 9/2000 | Nataraj et al. |
| 6,139,810 A | 10/2000 | Gottzmann et al. |
| 6,214,066 B1 | 4/2001 | Nataraj et al. |
| 6,402,988 B1 | 6/2002 | Gottzmann et al. |
| 6,492,290 B1 | 12/2002 | Dyer et al. |
| 6,537,514 B1 | 3/2003 | Prasad et al. |
| 6,695,983 B2 | 2/2004 | Prasad et al. |
| 7,179,323 B2 | 2/2007 | Stein et al. |
| 7,279,027 B2 | 10/2007 | Carolan et al. |
| 7,335,247 B2 | 2/2008 | Stein et al. |
| 7,425,231 B2 | 9/2008 | Carolan et al. |
| 7,427,368 B2 | 9/2008 | Drnevich |
| 7,513,932 B2 | 4/2009 | Carolan et al. |
| 7,658,788 B2 | 2/2010 | Holmes et al. |
| 7,686,856 B2 | 3/2010 | Hemmings et al. |
| 7,771,519 B2 | 8/2010 | Carolan et al. |
| 8,287,762 B2 | 10/2012 | Repasky |
| 2003/0039601 A1 | 2/2003 | Halvorson et al. |
| 2007/0292342 A1 | 12/2007 | Hemmings |
| 2008/0302013 A1 | 12/2008 | Repasky |
| 2013/0009102 A1 | 1/2013 | Kelly |

FOREIGN PATENT DOCUMENTS

| | | |
|---|---|---|
| EP | 0 926 097 A1 | 6/1999 |
| EP | 1 676 811 A2 | 7/2006 |

*Primary Examiner* — Melvin C Mayes
*Assistant Examiner* — Kenneth Vaden
(74) *Attorney, Agent, or Firm* — Bryan C. Hoke, Jr.

(57) ABSTRACT

Embodiments of the present invention provide cost-effective systems and methods for producing a synthesis gas product using a steam reformer system and an ion transport membrane (ITM) reactor having multiple stages, without requiring inter-stage reactant injections. Embodiments of the present invention also provide techniques for compensating for membrane performance degradation and other changes in system operating conditions that negatively affect synthesis gas production.

14 Claims, 5 Drawing Sheets

ION TRANSPORT MEMBRANE REACTOR SYSTEMS AND METHODS FOR PRODUCING SYNTHESIS GAS

STATEMENT REGARDING FEDERALLY SPONSORED RESEARCH OR DEVELOPMENT

This invention was made with government support under Contract Number DE-FC26-97FT96052 between Air Products and Chemicals, Inc. and the U.S. Department of Energy. The Government has certain rights to this invention.

BACKGROUND

Synthesis gas containing hydrogen and carbon oxides is an important feedstock for the production of a wide range of fuel and chemical products. For example, synthesis gas mixtures can be reacted catalytically to produce liquid hydrocarbons (e.g. via Fischer-Tropsch reactions) and oxygenated organic compounds including methanol, acetic acid, dimethyl ether, oxo alcohols, and isocyanates. High purity hydrogen and carbon monoxide can also be produced from synthesis gas by further processing and/or separation of synthesis gas. Processes for the utilization of synthesis gas are well-known.

Staged steam-methane reforming (SMR) processes are used for the design of new production facilities and to upgrade the performance of existing production facilities for producing synthesis gas. One type of staged reforming process utilizes a pre-reformer (e.g., an adiabatic reforming reactor containing highly active nickel catalyst) to reform heavier hydrocarbons in the feedstock (and a portion of the methane, if present) to yield a pre-reformed mixture of methane, hydrogen, carbon monoxide, carbon dioxide, and steam. This pre-reformed mixture is then further processed in a fired tubular reformer to produce a raw synthesis gas product. Another type of staged reformer process utilizes a pre-reformer followed by an autothermal reformer (ATR). Another type of staged reformer process utilizes a gas heated reformer (GHR) followed by an autothermal reformer (ATR). The GHR is a type of heat exchange reformer in which the hot raw synthesis gas from the ATR furnishes heat for the first reforming stage in the GHR. These, and other staged synthesis gas production processes, are well-known.

Another technology for synthesis gas production involves ion transport membrane (ITM) oxidation reactors, in which oxygen ions permeate through membranes and are reacted with oxidizable compounds to form oxidized or partially-oxidized reaction products. The practical application of these oxidation reactor systems requires membrane assemblies having large surface areas, flow passages to contact oxidant feed gas with the oxidant sides of the membranes, flow passages to contact reactant feed gas with the reactant sides of the membranes, and flow passages to withdraw product gas from the permeate sides of the membranes. These membrane assemblies may comprise a large number of individual membranes arranged and assembled into modules having appropriate gas flow piping to introduce feed gases into the modules and withdraw product gas from the modules.

ITMs may be fabricated in either planar or tubular configurations. In the planar configuration, multiple flat ceramic plates are fabricated and assembled into stacks or modules having piping means to pass oxidant feed gas and reactant feed gas over the planar membranes and to withdraw product gas from the permeate side of the planar membranes. In tubular configurations, multiple ceramic tubes may be arranged in bayonet or shell-and-tube configurations with appropriate tube sheet assemblies to isolate the oxidant and reactant sides of the multiple tubes. The individual membranes used in planar or tubular module configurations typically comprise very thin layers of active membrane material supported on material having large pores or channels that allow gas flow to and from the surfaces of the active membrane layers.

Synthesis gas production systems can utilize ITM oxidation reactors in combination with other reforming techniques, such as indirect-heated primary reforming (e.g., SMR). For example, U.S. Pat. No. 6,048,472 to Nataraj et al., which is hereby incorporated in its entirety by reference, discloses a synthesis gas production system involving an initial SMR reforming step followed by final conversion to synthesis gas in an ITM oxidation reactor. The Nataraj system is designed to convert heavier hydrocarbons (e.g. C2 through C6, and greater) and a portion of feed methane to synthesis gas in the SMR, and then perform higher-temperature conversion of a portion of the remaining methane into synthesis gas in the ITM oxidation reactor. By converting the heavier hydrocarbons and generating hydrogen in the gas mixture prior to entering the ITM oxidation reactor, the ITM oxidation reactor can be operated at higher temperatures without resulting carbon deposition therein. The addition of an ITM oxidation reactor following an SMR is also an attractive option to de-bottleneck (or increase the production capacity of) an existing SMR facility.

A recent development in ITM oxidation reactor technology involves the use of a plurality of oxidation reactor stages in series. As disclosed in U.S. Pat. No. 8,262,755 to Repasky et al., which is hereby incorporated herein in its entirety, it was recognized that the exothermic reactions that occur throughout traditional ITM oxidation reactors (e.g., the ITM oxidation reactor of Nataraj) can result in excessive temperature gradients across the membranes and significantly limit membrane life, particularly in concentrated systems and/or high conversion systems (both of which are of important industrial interest). By utilizing a plurality of oxidation reactor stages in series, the extent of reaction across each stage could be regulated to limit excessive temperature gradients across the membranes of each individual stage as well as the cumulative temperature increase across the stages of the reactor system.

Such staged ITM oxidation reactor systems can be costly and difficult to construct. For example, specialized and expensive materials must be employed in the reactant zones of each stage in order to provide the inter-stage injections, such as special injector nozzles that can reliably withstand elevated temperature and pressure conditions.

In commercial synthesis gas production environments that utilize ITM oxidation reactor systems, including known staged and non-staged ITM reactor systems in combination with other technologies such as oxygen-blown primary reforming (e.g., ATR) and/or indirect-heated primary reforming (e.g., SMR), the performance of the ITM reactor systems is sensitive to changes in system operating conditions and degradation of the membrane material performance over extended time of operation (or age of the membrane materials in operation). For example, the ceramic membrane material and the components of the membrane modules can be subjected to significant mechanical stresses during normal steady-state operation and during unsteady-state startup, shutdown, and upset conditions. These stresses may be caused by thermal expansion and contraction of the ceramic material and by dimensional variance caused by chemical composition or crystal structure changes due to changes in the oxygen stoichiometry of the membrane material. In addition, membrane materials have upper temperature limits above which membrane material degradation and/or module damage may occur. All of these effects can negatively impact the performance of the ITM oxidation reactor system and therefore the larger synthesis gas production process. Even under ideal operating conditions, some degradation in membrane performance is to be expected over extended time of operation.

There is a need in the art for synthesis gas production systems comprising ITM oxidation reactors and methods for operating the same that are cost-effective and which enable operators to readily compensate for membrane performance degradation and other changes in system operating conditions that affect synthesis gas production.

SUMMARY

Embodiments of the present invention satisfy the need in the art by providing cost-effective systems and methods for producing synthesis gas using steam reformer systems and multiple-stage ITM oxidation reactors that do not require inter-stage reactant injections. There are several aspects of the systems and methods, as outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A method for producing a synthesis gas product (150) comprising hydrogen and carbon monoxide, comprising the steps of:

(a) reacting a reactant gas mixture (118) comprising steam and a hydrocarbon in a primary reformer system (119) to form an intermediate gas mixture (138) having a composition comprising methane, hydrogen, and carbon oxides;

(b) introducing at least a portion of the intermediate gas mixture (138) into a membrane oxidation reactor system (144) comprising a plurality of membrane oxidation reactor stages (300a-n) arranged in series including a first membrane oxidation reactor stage (300a) and a second membrane oxidation reactor stage (300b) in the series, each stage comprising a membrane oxidation reactor (302a-n) and a catalyst (312a-n), each membrane oxidation reactor (302a-n) comprising a reactant zone (304a-n), an oxidant zone (306a-n), and one or more mixed metal oxide membranes (308a-n) separating the reactant zone from the oxidant zone, wherein all of the intermediate gas mixture (138) that is introduced into the membrane oxidation reactor system (144) is introduced into the reactant zone (304a) of the first membrane oxidation reactor stage (300a) of the plurality of membrane oxidation reactor stages (300a-n), and wherein each of the reactant zones (304a-n) of the plurality of membrane oxidation reactor stages (300a-n) has an effluent discharged therefrom, wherein at least a portion of the effluent from the reactant zone (304a) of the first membrane oxidation reactor stage (300a) is introduced into the reactant zone (304b) of the second membrane oxidation reactor stage (300b) as a feed thereto, and wherein the feed to the reactant zone (304b) of the second membrane oxidation reactor stage (300b) consists of the at least a portion of the effluent from the first membrane oxidation reactor stage (300a);

(c) introducing an oxygen-containing oxidant gas mixture (146a-n) into the oxidant zone (306a-n) of each of the plurality of membrane oxidation reactor stages (300a-n), and permeating oxygen through the one or more mixed metal oxide membranes (308a-n) of each of the plurality of membrane oxidation reactor stages (300a-n);

(d) reacting the at least a portion of the intermediate gas mixture (138) with the oxygen that has permeated through the one or more mixed metal oxide membranes (308a-n) of one or more of the plurality of membrane oxidation reactor stages (300a-n) to form the synthesis gas product (150); and (e) discharging the synthesis gas product (150) as an effluent from (the last membrane oxidation reactor stage (300n) in the series of) the membrane oxidation reactor system (144).

Aspect 2. The method of Aspect 1, wherein the primary reformer system (119) comprises a fired tubular reformer (128).

Aspect 3. The method of Aspects 1 or 2, wherein the primary reformer system (119) comprises at least one of an oxygen-blown reformer (204), an auto-thermal reformer (204), and a partial oxidation reactor.

Aspect 4. The method of any of Aspects 1 through 3, wherein the synthesis gas product (150) consists essentially of hydrogen, carbon monoxide, carbon dioxide, any unreacted portion of the intermediate gas mixture (138), and any unreacted oxygen.

Aspect 5. The method of any of Aspects 1 through 4, wherein the primary reformer system (119) is operated such that the composition of the intermediate gas mixture (138) is essentially at chemical equilibrium with respect to the steam reforming reaction.

Aspect 6. The method of any of Aspects 1 through 5, wherein the composition of the at least a portion of the intermediate gas mixture (138) that is introduced into the membrane oxidation reactor system (144) is essentially at chemical equilibrium with respect to the steam reforming reaction.

Aspect 7. The method of any of Aspects 1 through 6, wherein the membrane oxidation reactor system (144) is operated such that the composition of the synthesis gas product effluent (150) from the membrane oxidation reactor system (144) is essentially at chemical equilibrium with respect to the steam reforming reaction.

Aspect 8. The method of any of Aspects 1 through 7, further comprising:

(f) determining a target operating temperature value for the intermediate gas mixture (138) as a function of a measured temperature of the synthesis gas product (150) from the membrane oxidation reactor system (144); and (g) controlling reaction conditions of the primary reformer system (119) as a function of the target operating temperature value for the intermediate gas mixture (138).

Aspect 9. The method of any of Aspects 1 through 7, further comprising:

(f) measuring the temperature of the synthesis gas product (150) from (the last membrane oxidation reactor stage (300n) in the series of) the membrane oxidation reactor system (144); and (g) controlling reaction conditions of the primary reformer system (119) as a function of the measured temperature of the synthesis gas product (150) from the membrane oxidation reactor system (144).

Aspect 10. The method of Aspect 9, wherein step (g) comprises:

adjusting an operating temperature of the primary reformer system (119) as a function of the measured temperature of the synthesis gas product (150) from the membrane oxidation reactor system (144).

Aspect 11. The method of Aspect 9, wherein the primary reformer system (119) comprises a fired tubular reformer (128) and step (g) comprises:

adjusting at least one of a flow rate and a composition of combustion fuel (132) to the fired tubular reformer (128) as a function of the measured temperature of the synthesis gas product effluent (150) from the membrane oxidation reactor system (144).

Aspect 12. The method of Aspect 9, wherein the primary reformer system (119) comprises at least one of an oxygen-blown reformer (204), an auto-thermal reformer (204), and a partial oxidation reactor, and step (g) comprises:

adjusting a flow rate of oxygen to the primary reformer system (119) as a function of the measured temperature of the synthesis gas product effluent (150) from the membrane oxidation reactor system (144).

Aspect 13. The method of Aspect 9, wherein step (g) comprises:

adjusting at least one of an amount of hydrocarbon contained in the reactant gas mixture (118), an amount of steam contained in the reactant gas mixture (118), and a molar ratio of steam-to-carbon contained in the reactant gas mixture (118).

Aspect 14. The method of Aspect 9, wherein step (g) comprises:

controlling reaction conditions of the primary reformer system (119) to maintain the measured temperature of the synthesis gas product effluent (150) from the membrane oxidation reactor system (144) while performance of the one or more mixed metal oxide membranes (308a-n) degrades.

Aspect 15. The method of Aspect 9, wherein step (g) comprises:

controlling reaction conditions of the primary reformer system (119) to maintain the measured temperature of the synthesis gas product effluent (150) from the membrane oxidation reactor system (144) while a production rate of synthesis gas product effluent (150) from the membrane oxidation reactor system (144) is reduced.

Aspect 16. The method of Aspect 9, wherein step (g) comprises:

controlling reaction conditions of the primary reformer system (119) to maintain the measured temperature of the synthesis gas product effluent (150) from the membrane oxidation reactor system (144) while a production rate of synthesis gas product effluent (150) from the membrane oxidation reactor system (144) is increased.

Aspect 17. The method of any one of Aspects 1 through 16 wherein the plurality of membrane oxidation reactor stages (300a-n) comprises a third membrane oxidation reactor stage (300c), at least a portion of the effluent from the reactant zone of the second membrane oxidation reactor stage being introduced into the reactant zone of the third membrane oxidation reactor stage as a feed thereto, and wherein the feed to the reactant zone of the third membrane oxidant reactor stage consists of the at least a portion of the effluent from the second membrane oxidation reactor stage, the third membrane oxidation reactor stage being arranged serially directly downstream of the second membrane oxidation reactor stage.

Aspect 18. The method of any one of Aspects 1 through 16 wherein the plurality of membrane oxidation reactor stages (300a-n) comprise n membrane oxidation reactor stages (300a-n), wherein the integer n≥3, at least a portion of the effluent from the reactant zone of the $(k-1)^{th}$ membrane oxidation reactor stage being introduced into the reactant zone of the $k^{th}$ membrane oxidation reactor stage as a feed thereto for k≥3, and wherein the feed to the reactant zone of the $k^{th}$ membrane oxidant reactor stage consists of the at least a portion of the effluent from the $(k-1)^{th}$ membrane oxidation reactor stage for each integer k≤n, the $k^{th}$ membrane oxidation reactor stage being arranged serially directly downstream of the $(k-1)^{th}$ membrane oxidation reactor stage.

Aspect 19. The method of any one of Aspects 1 through 16 wherein at least a portion of the effluent from each of the membrane oxidation reactor stages (300a-n) upstream of at least one of the membrane oxidation reactor stages (300a-n) is introduced into the reactant zone of the respective next downstream membrane oxidation reactor stage; and wherein, for each of the membrane oxidation reactor stages (300b-n) downstream of the first membrane oxidation reactor stage (300a), all of the gas that is introduced into the reactant zone (304a-n) of the respective membrane oxidation reactor stage (300b-n) is at least a portion of the effluent from at least one of the membrane oxidation reactor stages (300a-n) arranged serially upstream of the respective membrane oxidation reactor stage (300b-n).

Aspect 20. A system for producing a synthesis gas product (150) comprising hydrogen and carbon monoxide, the system comprising:

a primary reformer system (119), the primary reformer system operatively configured to react a reactant gas mixture comprising steam and a hydrocarbon to produce an intermediate gas mixture comprising methane, hydrogen, and carbon oxides;

a membrane oxidation reactor system (144) operatively disposed to receive at least a portion of the intermediate gas mixture from the primary reformer system (119);

wherein the membrane oxidation reactor system (144) comprises a plurality of membrane oxidation reactor stages (300a-n) arranged in series, including a first membrane oxidation reactor stage (300a) and a second membrane oxidation reactor stage (300b) in the series, each stage (300a-n) comprising a membrane oxidation reactor (302a-n) and a catalyst (312a-n), each membrane oxidation reactor (302a-n) comprising a reactant zone (304a-n), an oxidant zone (306a-n), and one or more mixed metal oxide membranes (308a-n) separating the reactant zone from the oxidant zone;

wherein the oxidant zone (306a-n) of each membrane oxidation reactor is operatively disposed to receive an oxygen-containing oxidant gas mixture (146a-n);

wherein the reactant zone (304a) first membrane oxidation reactor stage (300a) in the series of the plurality of membrane oxidation reactor stages (300a-n) is operatively disposed to receive all of the intermediate gas mixture (138) that is received by the membrane oxidation reactor system (144);

wherein the reactant zone (304b) of the second membrane oxidation reactor stage (300b) is operatively disposed to receive at least a portion of an effluent discharged from the reactant zone (304a) of the first membrane oxidation reactor stage (300a) as the only feed to the reactant zone (304b) of the second membrane oxidation reactor stage (300b); and wherein the membrane oxidation reactor system (144) is operatively configured to react the at least a portion of the intermediate gas mixture with oxygen from the oxygen-containing gas mixture that has permeated through the one or more mixed metal oxide membranes (308a-n) of one or more of the plurality of membrane oxidation reactor stages (300a-n) to produce the synthesis gas product (150).

Aspect 21. The system of Aspect 20 wherein the plurality of membrane oxidation reactor stages comprises a third membrane oxidation stage that is operatively disposed to receive at least a portion of the effluent discharged from the reactant zone of the second membrane oxidation reactor stage as the only feed to the reactant zone of the third membrane oxidation reactor stage, the third membrane oxidation reactor stage being arranged serially directly downstream of the second membrane oxidation reactor stage.

Aspect 22. The system of Aspect 20 wherein the plurality of membrane oxidation reactor stages (300a-n) comprise n membrane oxidation reactor stages (300a-n), wherein the integer n≥3, wherein the reactant zone of the $k^{th}$ membrane oxidation stage is operatively disposed to receive at least a portion of the effluent discharged from the reactant zone of the $(k-1)^{th}$ membrane oxidation reactor stage as the only feed to the reactant zone of the $k^{th}$ membrane oxidation reactor stage for each integer k≤n and k≥3, the $k^{th}$ membrane oxidation reactor stage being arranged serially directly downstream of the $(k-1)^{th}$ membrane oxidation reactor stage.

Aspect 23. The system of Aspect 20 wherein the reactant zone of each membrane oxidation reactor stage (300b-n) downstream of the first membrane oxidation reactor stage (300a) is operatively configured to receive at least a portion of the effluent from the reactant zone of the respective upstream membrane oxidation reactor stage; and wherein each of the membrane oxidation reactor stages (300b-n) downstream of the first membrane oxidation reactor stage (300a) is operatively configured so that all of the gas that is introduced into the reactant zone (304b-n) of the respective membrane oxidation reactor stage (300b-n) is the at least a portion of the effluent from the membrane oxidation reactor stage arranged serially upstream of the respective membrane oxidation reactor stage (300b-n).

Aspect 24. The system of any one of Aspects 20 through 23, wherein the primary reformer system (119) comprises a fired tubular reformer (128).

Aspect 25. The system of any one of Aspects 20 through 23 wherein the primary reformer system (119) comprises at least one of an oxygen-blown reformer (204), an auto-thermal reformer (204), and a partial oxidation reactor.

Aspect 26. The method of any one of Aspects 1 through 19 or the system of any one of Aspects 20 through 25, further comprising:
one or more flow control devices (134) configured to regulate a flow to the primary reformer system (119) of at least one of: combustion fuel, oxygen, steam, and the hydrocarbon;
one or more temperature sensors (152) configured to measure a temperature of the synthesis gas product effluent produced by the membrane oxidation reactor system (144); and
a control logic configured to control at least one of the one or more flow control devices (134) as a function of the measured temperature of the synthesis gas product effluent produced by the membrane oxidation reactor system (144).

Aspect 27. The method or system of any of the preceeding aspects where the at least a portion of the intermediate gas mixture is a divided portion.

Aspect 28. The method or system of any of the preceeding aspects where the at least a portion of the intermediate gas mixture is a separated portion.

Aspect 29. The method of Aspect 2 further comprising:
providing a flow control device (132) for regulating the flow rate of a fuel to the fired tubular reformer (128); and
providing a second flow control device for regulating the flow rate of oxygen in an oxygen-containing gas to the fired tubular reformer (128);
wherein heat for the reforming reaction is provided by combusting the fuel with the oxygen in the oxygen-containing gas.

Aspect 30. The system of Aspect 24 further comprising:
a flow control device (132) for regulating the flow rate of a fuel to the fire tubular reformer (128);
a second flow control device for regulating the flow rate of oxygen to the fired tubular reformer (128).

Aspect 31. The method of Aspect 3 further comprising:
providing a flow control device (208) for regulating the flow rate of oxygen to the at least one of an oxygen-blown reformer (204), and auto-thermal reformer (204), and a partial oxidation reactor.

Aspect 32. The system of Aspect 25 further comprising:
a flow control device (208) for regulating the flow rate of oxygen to the at least one of an oxygen-blown reformer (204), and auto-thermal reformer (204), and a partial oxidation reactor.

Aspect 33. The method or system of Aspect 26, wherein the control logic is configured to determine if the measured temperature of the synthesis gas product effluent produced by the membrane oxidation reactor system (144) is below a target temperature or temperature range for that product effluent and/or is configured to determine if the measured temperature of the synthesis gas product effluent produced by the membrane oxidation reactor system (144) is above a target temperature or temperature range for that product effluent;
and wherein the control logic is configured to control at least one of the one or more flow control devices (134) such that the temperature of the intermediate gas mixture (138) is increased if the temperature of the synthesis gas product effluent produced by the membrane oxidation reactor system (144) is below the target temperature or temperature range for the product effluent and/or is configured to control at least one of the one or more flow control devices (134) such that the temperature of the intermediate gas mixture (138) is decreased if the temperature of the synthesis gas product effluent produced by the membrane oxidation reactor system (144) is above the target temperature or temperature range for the product effluent.

Aspect 34. The method or system of Aspect 33, wherein an operating temperature of the primary reformer system (119) is increased if the measured temperature of the synthesis gas product effluent produced by the membrane oxidation reactor system (144) is below the target temperature or temperature range for the product effluent and is decreased if the measured temperature of the synthesis gas product effluent produced by the membrane oxidation reactor system (144) is above a target temperature or temperature range for the product effluent.

BRIEF DESCRIPTION OF SEVERAL VIEWS OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
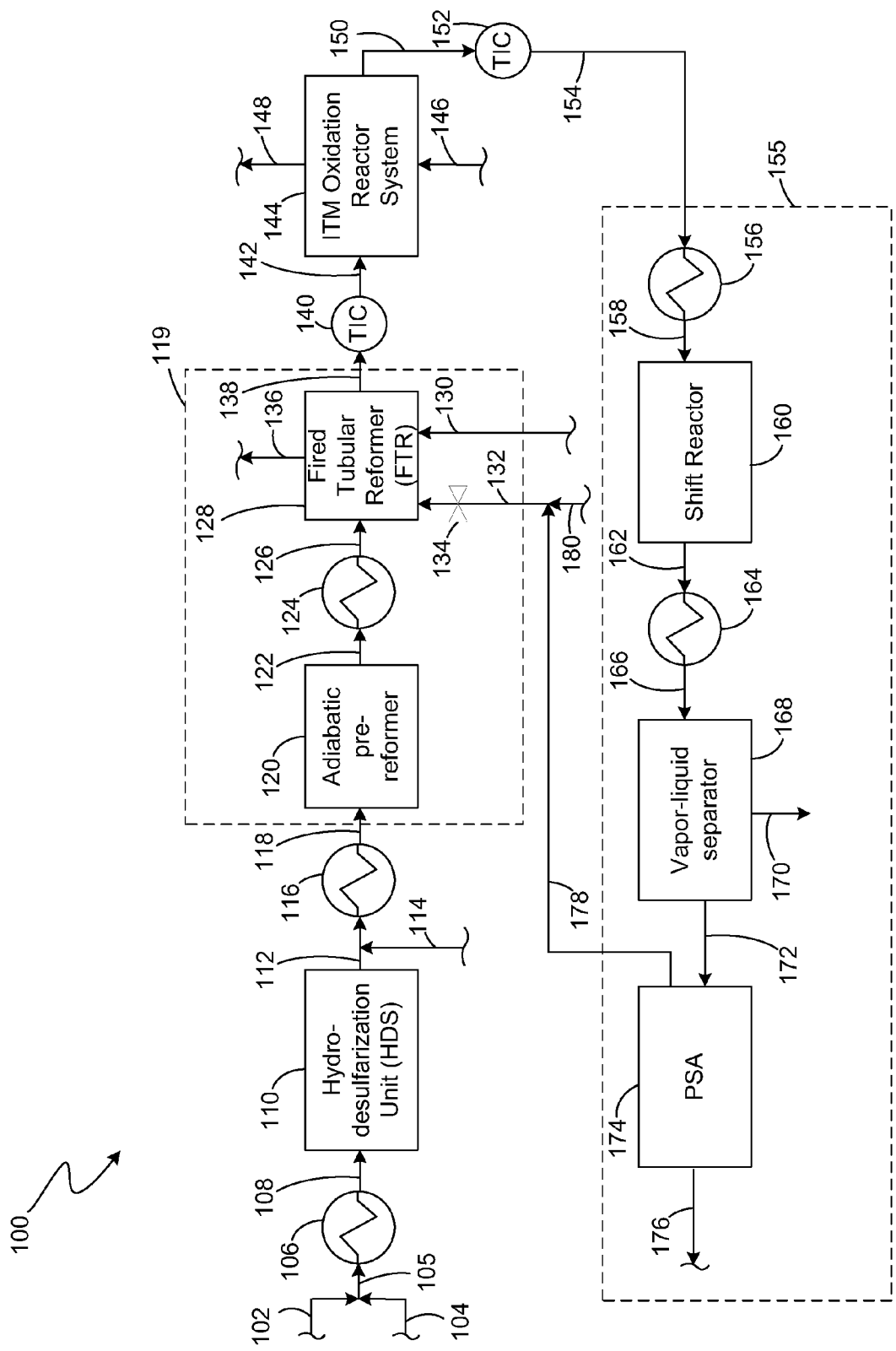
FIG. 1 is a block diagram of a synthesis gas production system in accordance with an embodiment of the present invention.

The ensuing detailed description includes preferred exemplary embodiments, which are not intended to limit the scope, applicability, or configuration of the invention. Rather, the ensuing detailed description of preferred exemplary embodiments will provide those skilled in the art with an enabling description for implementing preferred exemplary embodiments of the invention. Various changes may be made in the function and arrangement of elements without departing from the spirit and scope of the invention, as set forth in the appended claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The phrase "at least a portion" means "a portion or all." The at least a portion of a stream may have the same composition with the same concentration of each of the species as the stream from which it is derived. The at least a portion of a stream may have a different composition to that of the stream from which it is derived. The at least a portion of a stream may include specific components of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

The term "conduit," as used in the specification and claims, refers to one or more structures through which fluids can be transported between two or more components of a system. For example, conduits can include pipes, ducts, manifolds, and combinations thereof that transport liquids and/or gases at varying pressures throughout a reactor system.

The term "flow communication," as used in the specification and claims, refers to the nature of connectivity between two or more components that enables liquids and/or gases to be transported between the components. For example, a conduit can be in flow communication with an outlet of a heat exchanger and an inlet of a fired tubular reformer such that gas can be transported therebetween without leakage. Coupling two or more components such that they are in flow communication with each other can involve any suitable method known in the art, such as, for example, with the use of flanged conduits coupled using gaskets and bolts.

FIG. 1 is a block diagram of a synthesis gas production system 100 in accordance with an exemplary embodiment of the present invention. Conduit 102 carries a process feed (e.g., natural gas) for conversion to synthesis gas. In this exemplary embodiment, the process feed comprises methane and other components (e.g., heavier hydrocarbons, carbon oxides, nitrogen). Conduit 104 carries hydrogen that is combined with the process feed stream in order to promote desulfurization of the process feed in a hydro-desulfurization unit (HDS) 110. The process feed stream and hydrogen mixture is carried via conduit 105 to a heat exchanger 106.

The heat exchanger 106 heats the process feed stream and hydrogen mixture. The extent to which the heat exchanger 106 heats the process feed stream and hydrogen mixture can vary depending on the particular HDS 110 that is utilized. In this example, the heat exchanger 106 heats the feed stream and hydrogen mixture to approximately 700 degrees Fahrenheit (371 degrees Celsius).

Conduit 108 carries the heated feed stream and hydrogen mixture to HDS 110, which desulfurizes (i.e., removes sulfur from) the heated process feed stream and hydrogen mixture in order to preserve and protect catalysts that are used downstream in the synthesis gas production system 100. In this exemplary embodiment, HDS 110 utilizes typical HDS catalyst such as cobalt-molybdenum (CoMo) catalyst and/or nickel-molybdenum (NiMo) catalyst and typical HDS adsorbent such as zinc oxide (ZnO).

Conduit 112 carries the desulfurized process feed stream and hydrogen mixture, to which steam carried by conduit 114 is added, to a heat exchanger 116. In this example, the heat exchanger 116 heats the desulfurized process feed stream, hydrogen, and steam mixture to approximately 950 degrees Fahrenheit (510 degrees Celsius).

Conduit 118 carries the heated process feed stream, hydrogen, and steam mixture to a primary reformer system 119. In this exemplary embodiment, the primary reformer system 119 includes, among other components, an adiabatic pre-reformer 120, a heat exchanger 124, and a fired tubular reformer (FTR) 128. The heated process feed stream, hydrogen, and steam mixture is first fed to the adiabatic pre-reformer 120. In this exemplary embodiment the adiabatic pre-reformer 120 uses a typical pre-reforming catalyst with high nickel content, such as those available from Haldor Topsoe, Inc. The adiabatic pre-reformer 120 converts water and higher hydrocarbons (and often some portion of methane) to hydrogen and carbon oxides.

Conduit 122 carries the pre-reformed mixture to the heat exchanger 124, which heats the pre-reformed mixture. In this example, the heat exchanger 124 heats the pre-reformed mixture to approximately 1,000 degrees Fahrenheit (537 degrees Celsius).

Conduit 126 carries the heated pre-reformed mixture to the FTR 128 for further reforming. Conduits 130 and 132 carry a combustion air feed and fuel feed (e.g., a mixture of natural gas via conduit 180 and recycled purge gas via conduit 178 from a pressure swing adsorption system 174), respectively, to the FTR 128. Within the FTR 128, the combustion air feed and fuel feed are combusted to generate and provide heat to the pre-reformed mixture contained within tubes within the FTR furnace. Under these conditions, the pre-reformed mixture undergoes further reforming in which methane and steam react to produce an intermediate synthesis gas mixture comprising carbon monoxide, carbon dioxide, and hydrogen. In a preferred embodiment, the composition of the intermediate synthesis gas mixture is essentially at chemical equilibrium (i.e., a state in which the reactants and products are present at concentrations which have essentially no further tendency to react with time) with respect to the steam reforming reaction upon exiting the primary reformer system 119 (i.e., in FIG. 1, upon exiting FTR 128). Conduit 136 carries combustion flue gas effluent, which can be vented (typically after heat recovery) and/or provided to another component of the synthesis gas production system 100.

While this exemplary embodiment incorporates indirect-heated primary reforming via the FTR 128 in primary reformer system 119, other embodiments of the present invention can use different techniques, such as oxygen-blown reforming (e.g., auto-thermal reformers, partial oxidation reactors, catalytic partial oxidation reactors, etc.), heat exchange reforming (e.g., gas heated reformers, Haldor Topsoe convection reformers, enhanced heat transfer reformers, etc.), adiabatic reforming, and/or other known reforming technologies.

Conduit 138 carries the intermediate synthesis gas mixture to temperature indicator controller (TIC) 140. The TIC 140 measures the temperature of intermediate synthesis gas mixture as it exits the FTR 128, and also serves as a controller of the flow control device (e.g., valve) 134 that regulates the flow of the fuel feed to the FTR 128 via conduit 132. In this exemplary embodiment, the TIC 140 is configured by an operator for a particular operating temperature. If the measured temperature of the intermediate synthesis gas mixture is above or below the target operating temperature, the TIC 140 automatically controls the flow control device 134 to respectively increase or decrease the flow of the fuel feed to the FTR 128 and thereby increase or decrease the operating temperature of the FTR 128 until the target operating temperature is achieved.

Conduit 142 carries the intermediate synthesis gas mixture to an ITM oxidation reactor system 144. As discussed in greater detail with regard to FIG. 3, in embodiments of the present invention, the ITM oxidation reactor system 144 includes a plurality of membrane oxidation reactor stages in series, wherein each membrane oxidation reactor stage comprises a reactant zone, an oxidant zone, and one or more mixed metal oxide membranes separating the reactant zone from the oxidant zone. Conduit 146 carries an oxidant gas feed (e.g., air) to the ITM oxidation reactor system 144, and conduit 148 carries non-permeate effluent (i.e., oxygen-depleted oxidant gas) for venting or use elsewhere in the synthesis gas production system 100. However, the ITM oxidation reactor system 144 does not involve inter-stage injection of the intermediate synthesis gas mixture (i.e., the reactant gas feed). Instead, all of the intermediate synthesis gas mixture that is introduced into the ITM oxidation reactor system 144 is introduced into the first membrane oxidation reactor stage in the series of the plurality of membrane oxidation reactor stages. Accordingly, embodiments of the present invention obviate the need for expensive materials and/or complex design that might otherwise be necessary to achieve inter-stage reactant gas injections under high-temperature and high-pressure reaction conditions.

The membrane oxidation reactor stages 300*a-n* are arranged in a series having an upstream end and a downstream end with respect to the flow of the intermediate gas mixture through the stages of membrane oxidation reactor system. The first membrane oxidation reactor stage is the membrane oxidation reactor stage at the upstream end. The synthesis gas product 150 is discharged from the stage at the downstream end (i.e. the last membrane oxidation reactor stage in the series).

Within the ITM oxidation reactor system 144, the intermediate synthesis gas mixture is reacted with oxygen (as described more precisely with regard to FIG. 3) to produce a synthesis gas product comprising additional hydrogen and carbon monoxide, which is carried by conduit 150 to TIC 152.

In a preferred embodiment, the composition of the synthesis gas product is essentially at chemical equilibrium (i.e., a state in which the reactants and products are present at concentrations which have essentially no further tendency to react with time) with respect to the steam reforming reaction upon exiting the ITM oxidation reactor system 144.

The TIC 152 measures the temperature of synthesis gas product as it exits the ITM oxidation reactor system 144, and also serves as a controller of the flow control device 134 that regulates the flow of the fuel feed to the FTR 128 via conduit 132; temperature indication may or may not be provided. Alternatively, TIC 152 control may be manually provided by an operator, for example by controlling flow control device 134 in response to the temperature measured by TIC 152. In this exemplary embodiment, the TIC 152, like the TIC 140, can be configured by an operator for a particular operating temperature or range of temperatures. If the measured temperature of the synthesis gas product is above or below the target operating temperature or range of temperatures, the TIC 152 can directly control the flow control device 134 to respectively increase or decrease the flow of the fuel feed to the FTR 128 and thereby increase or decrease the operating temperature of the FTR 128 until the target operating temperature is achieved. Alternatively, the TIC 152 can adjust the operating temperature of the FTR 128 in an indirect, "cascading" manner by setting the operating temperature of the TIC 140, which in turn then regulates the flow of fuel to the FTR 128 to achieve that set operating temperature, as previously discussed. In other embodiments, the TIC 152 can be configured to adjust (e.g., via valves) the composition of the fuel feed to the FTR 128 to increase and decrease the operating temperature of the FTR 128. In yet other embodiments, the TIC 152 can be configured to adjust (e.g., via valves) the amount of steam and/or feed stream in the intermediate synthesis gas mixture. As discussed in greater detail with regard to FIG. 5, such adjustments affect the steam-to-carbon ratio of the process feed stream, hydrogen, and steam mixture to the adiabatic pre-reformer 120 and can be used to adjust oxygen-permeation across the membranes of the ITM oxidation reactor system 144 (e.g., to compensate for membrane performance degradation).

Conduit 154 carries the synthesis gas product to an optional processing system 155. Depending on the intended use of the synthesis gas product, an operator of the synthesis gas production system 100 may use the optional processing system 155 to further process the synthesis gas product. In this exemplary embodiment, the optional processing system 155 is used where a more concentrated hydrogen gas product is desired.

Conduit 154 carries the synthesis gas product to a heat exchanger 156, which cools the synthesis gas product. In this example, the heat exchanger 156 cools the synthesis gas product to approximately 650 degrees Fahrenheit (343 degrees Celsius). Conduit 158 carries the cooled synthesis gas product to a shift reactor 160. The shift reactor 160 is a high temperature shift (HTS) reactor vessel filled with a typical iron-chromium (FeCr) shift catalyst that reacts (i.e., "shifts") carbon monoxide and water to form additional carbon dioxide and hydrogen. In other embodiments, other known shift catalysts and reactor designs can be used. In a preferred embodiment, the composition of the synthesis gas product is essentially at chemical equilibrium (i.e., a state in which the reactants and products are present at concentrations which have essentially no further tendency to react with time) with respect to the steam reforming reaction upon exiting the shift reactor 160.

Conduit 162 carries the synthesis gas product to a heat exchanger 164 for further cooling. In this example, the heat exchanger 164 cools the synthesis gas product to approximately 100 degrees Fahrenheit (37 degrees Celsius), and conduit 166 carries the synthesis gas product to a vapor-liquid separator 168. The vapor-liquid separator 168 (i.e., a "knock-out pot") separates condensed water from the shifted synthesis gas product, which is then removed via conduit 170.

After water removal, conduit 172 carries the shifted synthesis gas product to pressure swing adsorption (PSA) system 174. PSA system 174 uses one or more adsorbent beds to separate methane, carbon oxides, nitrogen and any remaining water from the shifted synthesis gas product, thereby producing a concentrated hydrogen gas product that is carried via conduit 176. Upon purging the PSA system 174 (i.e., desorbing the adsorbed gas species), the purged gas is carried via conduit 178. In this exemplary embodiment, the purged gas is mixed with additional fuel (e.g., natural gas) from conduit 180 to provide the fuel feed in conduit 132 that is fed to FTR 128.

Figure 2:
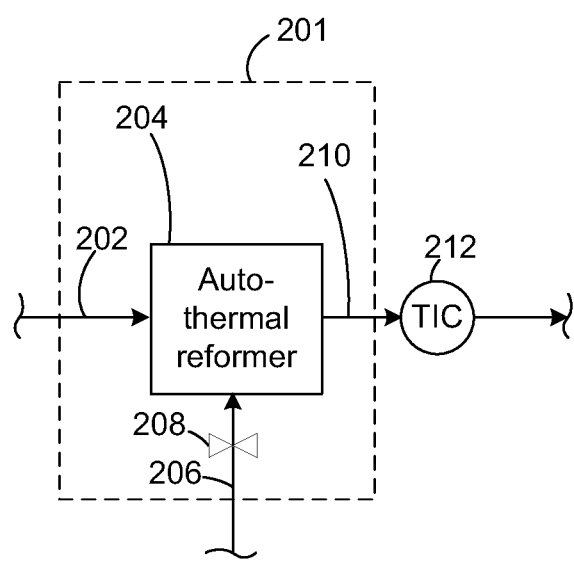
FIG. 2 is a block diagram of a synthesis gas production system in accordance with another embodiment of the present invention.

FIG. 2 is a block diagram of a primary reformer system in accordance with another exemplary embodiment of the present invention. In this exemplary embodiment, the primary reformer system 201 uses an auto-thermal reformer (ATR) 204 instead of the adiabatic pre-reformer 120 and the FTR 128. The primary reformer system 201 can be used with a synthesis gas production system identical to the synthesis gas production system 100. Accordingly, a detailed description of the ITM oxidation reactor system and remaining downstream components used in conjunction with the primary reformer system 201 can be found above and will not be repeated herein.

In this exemplary embodiment, conduit 202 carries a desulfarized process feed, hydrogen, and steam mixture to the ATR 204. Conduit 206 carries an oxygen-containing feed (e.g., pure oxygen, 99.5% oxygen, 95% oxygen, or air) to the ATR 204, and the flow of the oxygen-containing feed to the ATR 204 is regulated by a flow control device (e.g., valve) 208. Within the ATR 204, methane and water from the process feed, hydrogen, and steam mixture are reacted with oxygen (i.e., the methane is partially oxidized) to yield an intermediate synthesis gas mixture comprising carbon monoxide, carbon dioxide, and hydrogen.

Conduit 210 carries the intermediate synthesis gas mixture to a TIC 212, which measures the temperature of intermediate synthesis gas mixture and also serves as a controller of the flow control device 208 that regulates the flow of the oxygen-containing feed to the ATR 204 via conduit 206. As previously discussed with regard to the synthesis gas production system 100, the TIC 212 is configured by an operator for a particular operating temperature. If the measured temperature of the intermediate synthesis gas mixture is above or below the target operating temperature, the TIC 212 automatically controls the flow control device 208. The TIC 212 regulates the flow of oxygen-containing feed to the ATR 204 to respectively increase or decrease the operating temperature of the ATR 204 until the target operating temperature is achieved. Similarly, the TIC (e.g., TIC 152) following the ITM oxidation reactor system (e.g., ITM oxidation reactor system 144) measures the temperature of synthesis gas product and, either directly or indirectly (i.e., in the cascading manner discussed earlier), adjusts the flow of oxygen-containing feed to the ATR 204, which affects operating temperature of the ATR 204.

Figure 3:
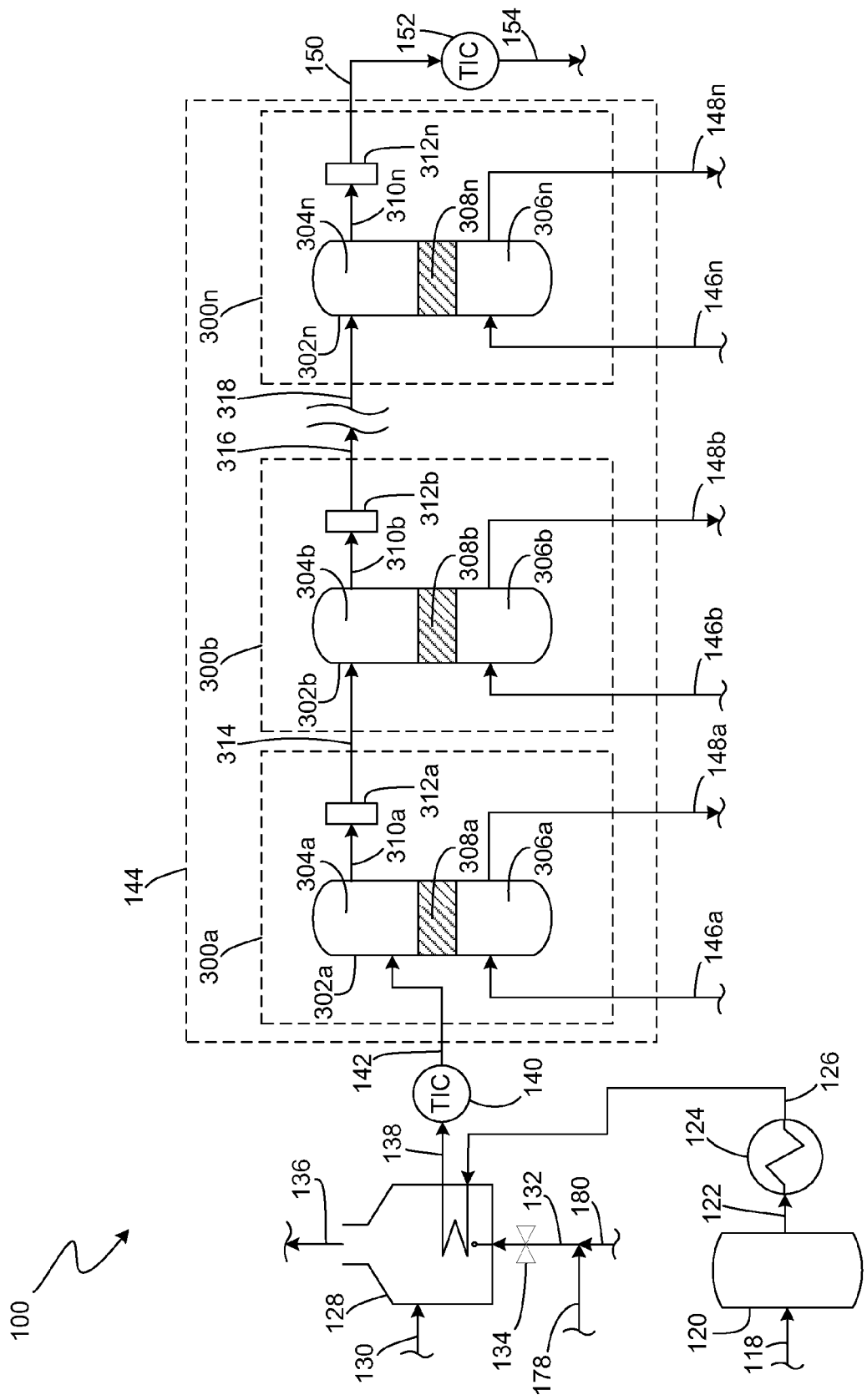
FIG. 3 is a block diagram of the synthesis gas production system of FIG. 1 in accordance an embodiment of the present invention.

FIG. 3 is a block diagram of the synthesis gas production system 100 of FIG. 1 showing a detailed example of the adiabatic pre-reformer 120, FTR 128, and ITM oxidation reactor system 144. Elements of the synthesis gas production system 100 apart from the ITM oxidation reactor system 144 will not be described in detail.

In this exemplary embodiment, the ITM oxidation reactor system 144 includes a plurality of membrane oxidation reactor stages 300a through 300n, wherein the membrane oxidation reactor stage 300a is the first membrane oxidation reactor stage, and the membrane oxidation reactor stage 300n is the last membrane oxidation reactor stage. Each of the membrane oxidation reactor stages 300a through 300n includes: a reactor 302 comprising a reactant zone 304, an oxidant zone 306, and one or more mixed metal oxide membranes 308 separating the reactant zone 304 and the oxidant zone 306; catalyst 312; a conduit 310 from the reactant zone 304 to the catalyst 312; a conduit 146 for carrying an oxidant gas feed to the oxidant zone 306; and a conduit 148 for carrying non-permeate effluent from the oxidant zone 306. Alternatively or in addition, catalyst 312 may be located within reactant zone 304 (eliminating need for conduit 310) and/or preceding reactant zone 304 (with appropriate conduits) and/or elsewhere within or around the ITM oxidation reactor system 144.

Between adjacent membrane oxidation reactor stages of membrane oxidation reactor stages 300a through 300n is an inter-stage conduit (e.g., conduits 314, 316, and 318) that carries effluent from the reactant zone 304 of the preceding stage (after passing the respective catalyst 312) to the reactant zone 304 of the subsequent, adjacent stage. With regard to the first membrane oxidation reactor stage 300a, conduit 142 carries the intermediate synthesis gas mixture to the reactant zone 302a; with regard to the last membrane oxidation reactor stage 300n, conduit 150 carries the effluent from the reactant zone 304n (i.e., the synthesis gas product) to the TIC 152.

In operation, the intermediate synthesis gas mixture is carried by conduit 142 to the reactant zone 302a of the first membrane oxidation reactor stage 300a. An oxidant gas feed (e.g., air) is carried by conduit 146a to the oxidant zone 306a. Oxygen from the oxidant gas disassociates into oxygen anions, which permeate (i.e., are transported) through the one or more mixed metal oxide membranes 308a to the reactant zone 304a, where the permeated oxygen reacts with the intermediate synthesis gas mixture to yield additional hydrogen and carbon monoxide. Non-permeate effluent (i.e., oxygen-depleted oxidant gas) is carried from the oxidant zone 306a via conduit 148a.

In this exemplary embodiment, conduit 310a carries the effluent from the reactant zone 304a (i.e., gas mixture comprising the unreacted portion of the intermediate synthesis gas mixture and the additional hydrogen and carbon monoxide) to the catalyst 312a. The catalyst 312a is implemented with one or more known catalysts that promote the reforming and shift reactions of the intermediate synthesis gas mixture (including permeated and reacted oxygen). A sufficient amount and design of catalyst 312a is provided in the first membrane oxidation reactor stage 300a such that the reaction of the intermediate synthesis gas mixture (and the permeated oxygen) can be driven substantially toward equilibrium, particularly of the steam-methane reforming and water gas shift reactions, prior to the effluent of the reactant zone 304a exiting the membrane oxidation reactor stage 300a. This feature helps to afford control over the reactions undergone within the membrane oxidation reactor stage 300a and, when applied to all membrane oxidation reactor stages 300a through 300n, helps to control the cumulative temperature increase throughout the ITM oxidation reactor system 144, without requiring inter-stage injections of the intermediate synthesis gas mixture (i.e., reactant gas) as is taught by the prior art (e.g., U.S. Pat. No. 8,262,755) In other embodiments, as previously discussed, the catalyst 312a can be disposed prior to the reactant zone 304a, within the reactant zone 304a, on or within the mixed metal oxide membranes 308a, or in any other suitable location within the membrane oxidation reactor stage 300a.

Conduit 314 carries the effluent from the reactant zone 304a (after passing the catalyst 312a in this exemplary embodiment) to the reactant zone 304b of the membrane oxidation reactor stage 300b. Structurally, membrane oxidation reactor stage 300b is the same as membrane oxidation reactor stage 300a. As previously discussed, oxygen from the oxidant gas feed in conduit 146b disassociates into oxygen anions, which permeate (i.e., are transported) through the one or more mixed metal oxide membranes 308b to the reactant zone 304b, where the permeated oxygen recombines and reacts with the effluent from the reactant zone 304a to yield additional hydrogen and carbon monoxide. Non-permeate effluent is carried from the oxidant zone 306b via conduit 148b.

Conduit 310b carries the effluent from the reactant zone 304b (i.e., gas mixture comprising the unreacted portion of the intermediate synthesis gas mixture, the additional hydrogen and carbon monoxide produced in the first membrane oxidation reactor stage 300a, and the additional hydrogen and carbon monoxide produced in membrane oxidation reactor stage 300b) to the catalyst 312b, which drives the reaction of the effluent and permeated oxygen substantially toward equilibrium.

Conduit 316 carries the effluent from the reactant zone 304b (after passing the catalyst 312b) to the reactant zone 304 of the next adjacent membrane oxidation reactor stage. As shown in FIG. 3, the number of intervening membrane oxidation reactor stages having the same structure between the first membrane oxidation reactor stage 300a and the last membrane oxidation reactor stage 300n can be any number. Generally, a greater number of membrane oxidation reactor stages in series provides increasingly granular control over the overall increase of operating temperatures across the ITM oxidation reactor system 144 during conversion of the intermediate synthesis gas to the synthesis gas product.

Conduit 318 carries the effluent from the reactant zone 304 of the membrane oxidation reactor stage 300 that adjacently precedes the last membrane oxidation reactor stage 300n, to the reactant zone 304n. Again, oxygen from the oxidant gas feed disassociates into oxygen ions, which permeate (i.e., are transported) through the one or more mixed metal oxide membranes 308n to the reactant zone 304n, where the permeated oxygen reacts with the effluent to yield additional hydrogen and carbon monoxide. Non-permeate effluent is carried from the oxidant zone 306n via conduit 148n.

Conduit 310n carries the effluent from the reactant zone 304n (i.e., gas mixture comprising the unreacted portion of the intermediate synthesis gas mixture, the additional hydrogen and carbon monoxide produced in all of the preceding oxidation reactor stages, and the additional hydrogen and carbon monoxide produced in the last membrane oxidation reactor stage 300n) to the catalyst 312n, which drives the reaction of the effluent and permeated oxygen substantially toward equilibrium. Conduit 150 then carries the effluent (i.e., the synthesis gas product) from the catalyst 312n to the TIC 152.

Accordingly, all of the intermediate synthesis gas mixture that is introduced into the ITM oxidation reactor system 144 via conduit 142 is introduced into the reactant zone 304a of the first membrane oxidation reactor stage 300a, obviating the need for inter-stage reactant gas injections to control increases in temperature throughout the ITM oxidation reactor system 144. Rather, increases in temperature gradient across the mixed metal oxide membranes 308 within each of membrane oxidation reactor stage 300a through 300n, as well as increases in temperature gradient overall across the ITM oxidation reactor system 144, are limited in part by catalyzing the reactions within each of membrane oxidation reactor stages 300a through 300n substantially toward equilibrium, particularly of the steam-methane reforming and water gas shift reactions, and by performing some fraction of the conversion duty of the process gas feed (provided via conduit 118) to synthesis gas upstream of the ITM oxidation reactor system 144 (i.e., in the adiabatic pre-reformer 120 and FTR 128, in this exemplary embodiment).

Figure 4:
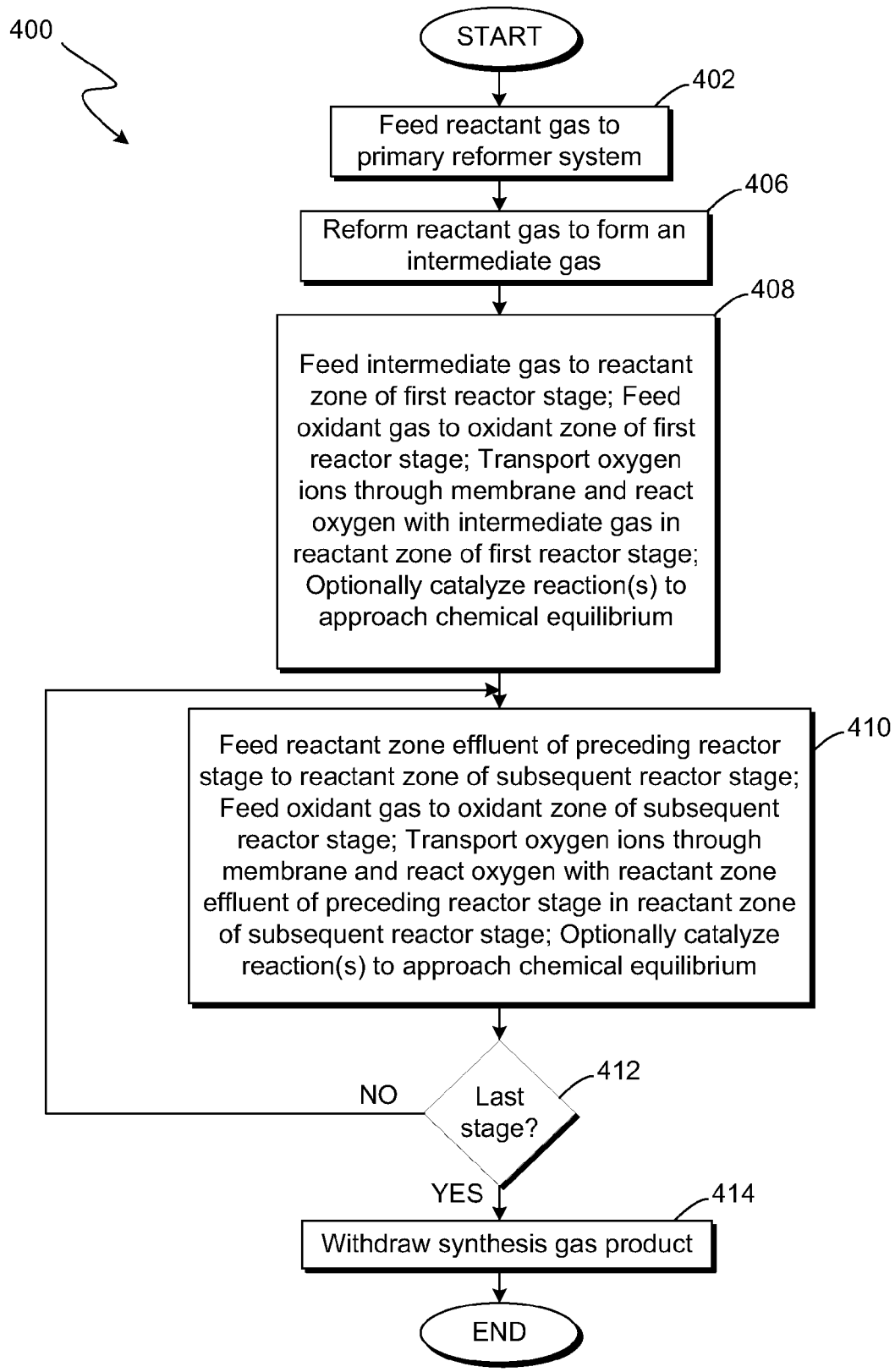
FIG. 4 is a flow chart illustrating operational steps for operating a synthesis gas production system to produce a synthesis gas product in accordance with an embodiment of the present invention.

FIG. 4 is a flow chart illustrating steps for operating a synthesis gas production system to produce a synthesis gas product in accordance with an embodiment of the present invention, where the synthesis gas production system includes an upstream primary reformer system and a downstream ITM oxidation reactor system having a plurality of membrane oxidation stages in series.

In step 402, a reactant gas comprising steam and methane (and/or other hydrocarbons) is fed to a primary reformer system (e.g., FTR 128). As previously discussed, in various embodiments of the invention, the primary reformer system can utilize different techniques such as indirect-heat reforming (e.g., FTR), oxygen-blown reforming (e.g., ATR) and heat exchange reforming, as will be apparent to those of ordinary skill in the art.

In step 406, the reactant gas is reformed in the primary reformer system to form an intermediate gas mixture comprising methane, carbon oxides, and hydrogen.

In step 408, multiple actions are performed concurrently: the intermediate gas mixture is fed to the reactant zone of the first oxidation reactor stage of the ITM oxidation reactor system; an oxidant gas is fed to the oxidant zone of the first oxidation reactor stage; oxygen from the oxidant gas disassociates into ions, which are transported through one or more membranes of the first oxidation reactor stage, where the oxygen then reacts with the intermediate gas mixture to form additional hydrogen and carbon monoxide; and the reaction of the intermediate gas mixture and the oxygen is optionally catalyzed to substantially approach chemical equilibrium. In other embodiments, these actions can be performed as one or more separate steps.

In step 410, multiple actions are performed concurrently: the reactant zone effluent from the preceding oxidation reactor stage (e.g., in the first iteration of the method steps the preceding stage is the first oxidation reactor stage) is fed to the reactant zone of the subsequent reactor stage (e.g., in the first iteration of the method steps the subsequent stage is the second oxidation reactor stage in the series); an oxidant gas is fed to the oxidant zone of the subsequent oxidation reactor stage; oxygen from the oxidant gas disassociates into ions, which are transported through one or more membranes of the subsequent oxidation reactor stage, where the oxygen then reacts with the reactant zone effluent of the preceding reactor stage; and the reaction of the reactant zone effluent of the preceding reactor stage and the oxygen is optionally catalyzed to substantially approach chemical equilibrium. In other embodiments, these actions can be performed as one or more separate steps.

In step 412, if the stage in which the reaction of step 410 took place is the last stage in the series of the membrane oxidation reactor stages, then, in step 414, the effluent from the reactant zone of that reactor stage is withdrawn as a synthesis gas product.

If, in step 412, the stage in which the reaction of step 410 took place is not the last stage in the series of the membrane oxidation reactor stages, then the operational steps repeat back at step 410, and so repeat for the remaining membrane oxidation reactor stages in the ITM oxidation reactor system (i.e., the reactant zone effluent from the second oxidation reactor stage is fed to the reactant zone of the third oxidation reactor stage in the series, and so on).

Figure 5:
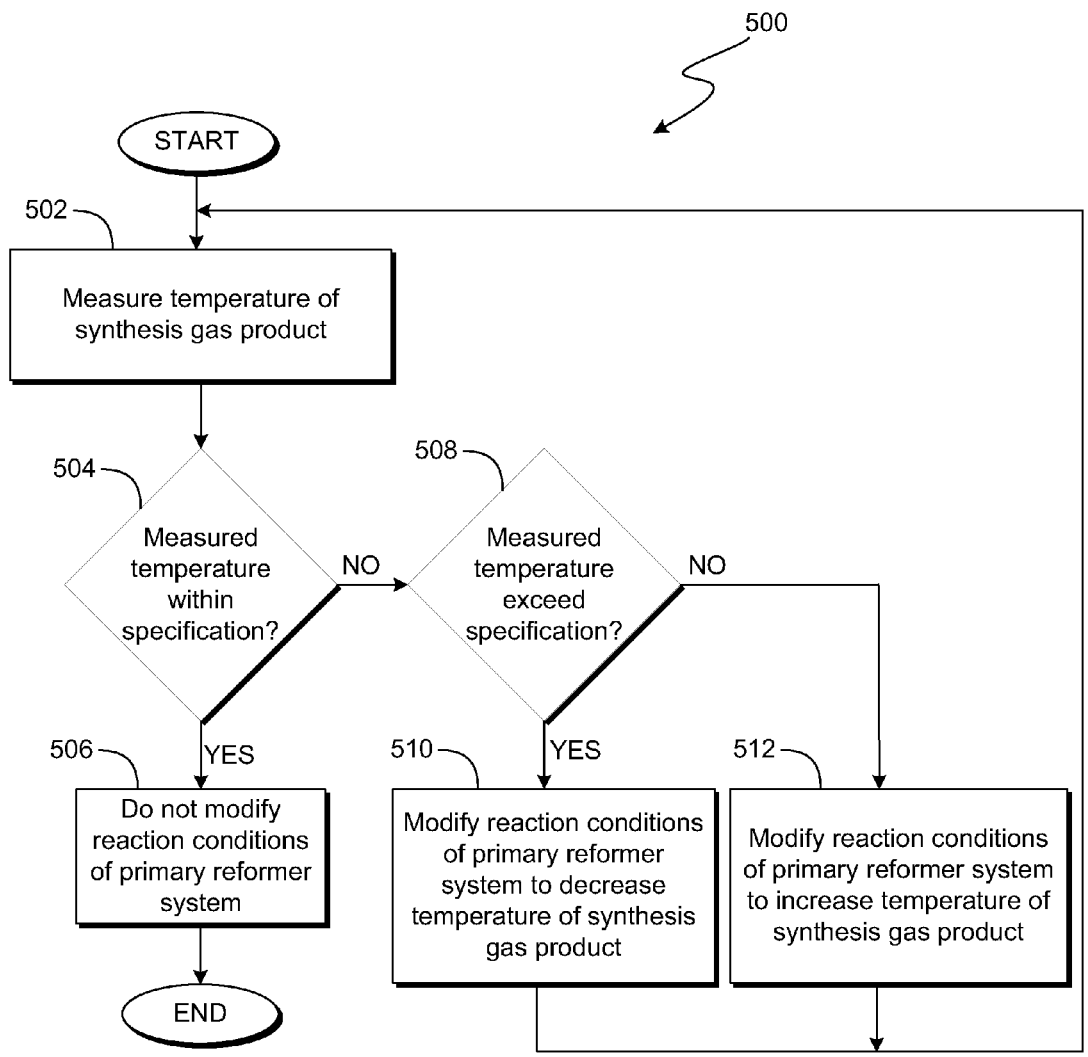
FIG. 5 is a flow chart illustrating operational steps for operating a synthesis gas production system to detect and compensate for membrane performance degradation and changes in system operating conditions that negatively affect synthesis gas production in accordance with an embodiment of the present invention.

FIG. 5 is a flow chart illustrating steps for operating a synthesis gas production system to detect and compensate for membrane performance degradation and changes in system operating conditions that affect synthesis gas production in accordance with an embodiment of the present invention. In this exemplary embodiment, the synthesis gas production system includes an upstream primary reformer system (e.g., comprising FTR, ATR, etc.) and a downstream ITM oxidation reactor system.

In step 502, a TIC (e.g., TIC 152) measures the temperature of a synthesis gas product exiting the ITM oxidation reactor system.

In step 504, a control logic of the TIC determines whether the measured temperature is within specification. In this exemplary embodiment, an operator of the synthesis gas production system can specify what temperature(s) are to be considered within specification. For example, the operator may specify a single target temperature that the measured temperature must equal to be considered within specification. In another example, the operator may specify a range of temperatures in which the measured temperature must fall to be considered within specification.

If, in step 504, the control logic of the TIC determines that the measured temperature is within specification, then, in step 506, the control logic of the TIC does not modify the reaction conditions of the primary reformer system.

If, in step 504, the control logic of the TIC determines that the measured temperature is not within specification, then, in step 508, the control logic of the TIC determines whether the measured temperature exceeds the specification. For example, if the operator specified a single target temperature, the measured temperature exceeds the specification if the measured temperature exceeds the target temperature. Similarly, if the operator specified a range of target temperatures, the measured temperature exceeds the specification if the measured temperature exceeds the upper bound of that range of target temperatures.

If, in step 508, the control logic of the TIC determines that the measured temperature exceeds the specification, then, in step 510, the control logic modifies reaction conditions of the primary reformer system (e.g., decrease the temperature of the intermediate synthesis gas mixture effluent of the primary reformer system to the ITM oxidation reactor system) so as to decrease the temperature of the synthesis gas product exiting the ITM oxidation reactor system. If, in step 508, the control logic of the TIC determines that the measured temperature did not exceed the specification (i.e., it is less than the target temperature or less than the lower bound of the range of target temperatures), then, in step 512, the control logic modifies reaction conditions of the primary reformer system (e.g., increase the temperature of the intermediate synthesis gas mixture effluent of the primary reformer system to the ITM oxidation reactor system) so as to increase the temperature of the synthesis gas product exiting the ITM oxidation reactor system.

By repeatedly performing the steps of FIG. 5, the control logic can maintain the measured temperature of the synthesis gas product exiting ITM oxidation reactor system at or within a finite number of degrees of the target temperature or range of target temperatures over period of time by modifying, when necessary, reaction conditions of the primary reformer system. In this manner, the control logic can maintain the measured temperature of the synthesis gas product exiting the ITM oxidation reactor system during a multitude of system conditions, such as an increase or decrease in the production rate of synthesis gas product (e.g., startup, shutdown, and turndown) and degradation of membrane performance within the ITM oxidation reactor system.

Modifying the reaction conditions of the primary reformer system to increase or decrease the temperature of the synthesis gas product exiting the ITM oxidation reactor system can be accomplished in several ways, depending on the type of primary reformer system used. For example, the control logic of the TIC can increase and decrease the operating temperature of an FTR by directly or indirectly regulating the flow of fuel gas to the FTR, as previously discussed with regard to FIG. 1. Doing so can result in the intermediate synthesis gas mixture being inputted to the ITM oxidation reactor system at a greater or lesser temperature, which can in turn result in an increased or decreased operating temperature of the ITM oxidation reactor system and an increased or decreased temperature of the synthesis gas product exiting the ITM oxidation reactor system, respectively. Similarly, the control logic can increase and decrease the operating temperature of an ATR to increase and increase the temperature of the intermediate synthesis gas mixture exiting the ATR by directly or indirectly regulating the flow of oxygen gas to the ATR, as previously discussed with regard to FIG. 2. In other embodiments, the TIC can be configured to adjust the amount of steam (e.g., within conduit 114 of FIG. 1) and/or process feed (e.g., within conduit 102 on FIG. 1) provided to the primary reformer system (e.g., to achieve a particular production capacity or steam-to-carbon ratio), and thereby adjust the oxygen-permeation across the membranes of the ITM oxidation reactor system. For example, decreasing the steam-to-carbon ratio (i.e., decreasing steam content relative to the amount of carbon-containing feed stream) can increase the temperature of the intermediate synthesis gas mixture effluent from the primary reformer system to the ITM oxidation reactor system (as well as the temperature of the synthesis gas product exiting the ITM oxidation reactor system) and enhance oxygen permeation across the membranes of the ITM oxidation reactor system, which can help to compensate for membrane performance degradation.

Operating a synthesis gas production system in accordance with the steps of flowchart 500 provides an efficient way to detect and compensate for membrane performance degradation and changes in system operating conditions that negatively affect synthesis gas production. As demonstrated and discussed in greater detail with regard to the example data of Tables 1-8 and Tables 9-12, the measured temperature of the synthesis gas product relative to a baseline temperature provides valuable information as to whether membrane performance has degraded and/or other changes in system operating conditions are affecting synthesis gas production. For example, membrane performance degradation typically results in lower temperatures of the synthesis gas product. By decreasing the steam-to-carbon ratio of the intermediate synthesis gas or by increasing the operating temperatures of the primary reformer system, the control logic can increase operating temperature of the intermediate synthesis gas mixture effluent from the primary reformer system to the ITM oxidation reactor system to enhance membrane performance, offset membrane performance degradation, and/or increase synthesis gas product production. Analogously, by increasing the steam-to-carbon ratio of the intermediate synthesis gas or by decreasing the operating temperatures of the primary reformer system, the control logic can decrease operating temperature of the intermediate synthesis gas mixture effluent from the primary reformer system to the ITM oxidation to degrade membrane performance and/or decrease synthesis gas product production.

EXAMPLES

The following are example scenarios in which synthesis gas production systems are operated in accordance with embodiments of the invention. The first set of examples and data provided in Tables 1 through 8 exemplify operation of a synthesis gas production system similar to the synthesis gas production system 100 of FIG. 1. The second set of example scenarios and data provided in Tables 9 through 12 exemplify operation of a synthesis gas production system similar to the synthesis gas production system 200 of FIG. 2. Certain parameters and data have been excluded from the following discussion for clarity. Accordingly, the example scenarios and the data provided in Tables 1-8 and Tables 9-12 are illustrative and not necessarily representative of complete systems and actual data that might exist when implementing embodiments of the invention.

Turning now to the first example scenario and data provided in Table 1, baseline simulation conditions are shown in which a desulfarized feed stream comprising 24.51 mol % methane, 0.51 mol % hydrogen, 0.02 mol % carbon dioxide, 74.16 mol % water, 0.71 mol % nitrogen, 0.08 mol % ethane, and 0.01 mol % propane is fed to an adiabatic pre-reformer (e.g., adiabatic pre-reformer 120), which produces a pre-reformed mixture comprising 22.27 mol % methane, 6.88 mol % hydrogen, 0.02 mol % carbon monoxide, 1.63 mol % carbon dioxide, 68.51 mol % water, and 0.69 mol % nitrogen that is then fed to an FTR (e.g., FTR 128).

The FTR further reforms the pre-reformed mixture to produce and intermediate synthesis gas mixture comprising 4.99 mol % methane, 45.34 mol % hydrogen, 7.72 mol % carbon monoxide, 5.48 mol % carbon dioxide, 35.94 mol % water, and 0.53 mol % nitrogen. The intermediate synthesis gas mixture is fed to an ITM oxidation reactor system (e.g., ITM oxidation reactor system 144), which produces a synthesis gas product comprising 0.98 mol % methane, 48.07 mol % hydrogen, 10.80 mol % carbon monoxide, 5.09 mol % carbon dioxide, 34.57 mol % water, and 0.49 mol % nitrogen.

In this example, the synthesis gas product is further refined in an optional refinement system (e.g., optional processing system 155) comprising an HTS reactor vessel (e.g., shift reactor 160), a water knock-out pot (e.g., vapor-liquid separator 168), and a PSA (e.g., PSA system 174). The synthesis gas product is refined to produce an essentially 100 mol % hydrogen product and a PSA purge gas comprising 4.24 mol % methane, 24.09 mol % hydrogen, 15.04 mol % carbon monoxide, 53.77 mol % carbon dioxide, and 0.23 mol % water. The PSA purge gas is then recycled (e.g., via conduit 178) for use as a fuel feed for the FTR.

Tables 2-6 show the results of perturbations in various system conditions relative to the baseline simulation of Table 1. Specifically, Table 2 shows a 25% reduction of the flow rate of the steam feed to the adiabatic pre-reformer. Table 3 shows a 25% reduction of the flow rate of the natural gas fuel feed to the fired tubular reformer. Table 4 shows a 25% reduction of the flow rate of the natural gas process feed to the adiabatic pre-reformer. Table 5 shows simulated turndown operating conditions collectively involving the 25% reductions of the flow rates of the steam feed, natural gas fuel feed, and natural gas process feed of Tables 2-4, respectively. Table 6 shows the local oxygen permeation performance of the membranes in the ITM oxidation reactor system degraded by approximately 20%, which compounds across the ITM oxidation reactor system resulting in a total degradation in oxygen permeation of approximately 23.4% relative to the baseline simulation of Table 1. Such degraded performance may result, for example, from improper design or manufacture of the ITM oxidation reactor system or from age.

Table 7 shows the system recovering and compensating for the membrane degradation shown in Table 6 by increasing the flow rate of the fuel provided to the FTR, as discussed in greater detail below.

Table 8 shows a comparative summary of the simulations of Tables 1-7. As shown in the Table 6 column of Table 8, where membrane performance is degraded relative to an expected or baseline performance (i.e., Table 1), less oxygen permeates the membranes and exothermically reacts with the intermediate synthesis gas, resulting in lower operating temperatures of the ITM oxidation reactor system and the synthesis gas product (e.g., 912.3 degrees Celsius or 1,674.1 degrees Fahrenheit, as compared to 950.0 degrees Celsius or 1,742.0 degrees Fahrenheit), as well as less synthesis gas product (e.g., hydrogen rate in the synthesis gas product exiting the ITM oxidation reactor system is now 4,800.4 kgmol/hr as compared to 4,905.3 kgmol/hr). It should be noted that the natural gas fuel feed to the FTR was reduced to offset the increased fuel content of the recycled fuel feed from the PSA to the FTR (i.e., on account of lower rates of synthesis and hydrogen production in the ITM oxidation reactor system). This was done for illustrative purposes in order make the conditions of the intermediate gas mixture feed to the FTR (e.g., flow rate, temperature, etc.) essentially identical for both the baseline case (i.e., Table 1) and the degraded case (i.e., Table 6).

The data in the Table 7 column of Table 8 shows how the synthesis gas production system recovers by compensating for the membrane degradation to increase synthesis gas product yields. In this example, the synthesis gas production system operates in accordance with the flowchart 500 of FIG. 5.

As discussed, the membrane degradation caused the temperature of the synthesis gas product exiting the ITM oxidation reactor system to decrease. A TIC (e.g., TIC 152) measured the temperature of the synthesis gas product (e.g., step 502) and determined that the measured temperature was not within specification (e.g., step 504). In this example, the specification was defined as a target temperature of 950.0 degrees Celsius or 1,742.0 degrees Fahrenheit (i.e., the same temperature as in the baseline case of column 1). In response, the control logic increased the operating temperature of the synthesis gas product by increasing the flow of fuel gas to the FTR (e.g., step 512). Depending on how the control logic of the TIC is configured, increases (or decreases) in flow of fuel gas to the FTR can be performed in increments of varying sizes. Accordingly, after making an adjustment to the flow of fuel gas to the FTR, the TIC may again resample the temperature of the synthesis gas product and make additional adjustments until the measured temperature is within specification.

In this example, the flow of natural gas fuel to the FTR was increased from 424 Mmbtu/hr to 516 Mmbtu/hr, which increased the temperature of the intermediate synthesis gas product to 855.6 degrees Celsius or 1,572.1 degrees Fahrenheit, and increased the temperature of the synthesis gas product exiting the ITM oxidation reactor system to the target temperature of 950.0 degrees Celsius or 1,742.0 degrees Fahrenheit. The increased operating temperatures within the ITM oxidation reactor system enhance oxygen permeation through the membranes, which in turn help to compensate for the degradation in membrane performance and increase the yield of synthesis gas product back to the base case value.

Turning now to the second example scenario and data provided in Table 9, baseline simulation conditions are shown in which a desulfarized feed stream comprising 38.95 mol % methane, 0.81 mol % hydrogen, 0.04 mol % carbon dioxide, 58.93 mol % water, 1.14 mol % nitrogen, 0.13 mol % ethane, and 0.01 mol % propane is fed to an ATR (e.g., ATR 204), which produces an intermediate synthesis gas mixture comprising 3.22 mol % methane, 44.48 mol % hydrogen, 13.05 mol % carbon monoxide, 7.15 mol % carbon dioxide, 31.42 mol % water, and 0.68 mol % nitrogen. The intermediate synthesis gas mixture is fed to an ITM oxidation reactor system (e.g., ITM oxidation reactor system 144), which produces a synthesis gas product comprising 1.32 mol % methane, 45.51 mol % hydrogen, 14.67 mol % carbon monoxide, 6.60 mol % carbon dioxide, 31.24 mol % water, and 0.65 mol % nitrogen.

Table 10 shows the local oxygen permeation performance of the membranes in the ITM oxidation reactor system degraded by approximately 20%, which compounds across the ITM oxidation reactor system resulting in a degradation in total oxygen permeation of approximately 30.2% relative to the data of Table 9 (i.e., the baseline simulation). Again, such degraded performance may result, for example, from improper design or manufacture of the ITM oxidation reactor system or from age.

Table 11 shows the system recovering and compensating for the membrane performance degradation shown in Table 10 by increasing the flow rate of the oxygen provided to the ATR, as discussed in greater detail below.

Table 12 shows a comparative summary of the simulations of Tables 9-11. As shown in the Table 10 column, where membrane performance has degraded, less oxygen permeates the membranes and exothermically reacts with the intermediate synthesis gas, resulting in lower operating temperatures of the ITM oxidation reactor system and the synthesis gas product (e.g., 935.1 degrees Celsius or 1,715.2 degrees Fahrenheit as compared to 950.0 degrees Celsius or 1,742.0 degrees Fahrenheit), as well as less synthesis gas product (e.g., rate of hydrogen and carbon monoxide generation in ITM oxidation reactor system is 292.1 kgmol/hr as compared to 358.4 kgmol/hr).

The data in the Table 11 column shows the synthesis gas production system recovering by compensating for the membrane degradation to increase synthesis gas product yields. In this example, the synthesis gas production system also operates in accordance with the flowchart 500 of FIG. 5.

As discussed, the membrane performance degradation caused the temperature of the synthesis gas product exiting the ITM oxidation reactor system to decrease. A TIC (e.g., TIC 152) measured the temperature of the synthesis gas product (e.g., step 502) and determined that the measured temperature was not within specification (e.g., step 504). In this example, the specification was again defined as a target temperature of 950.0 degrees Celsius or 1,742.0 degrees Fahrenheit (i.e., the same temperature as in the baseline case of the Table 9 column). In response, the control logic increased the temperature of the synthesis gas product by increasing the flow of oxygen to the ATR (e.g., step 512).

In this example, the flow of oxygen to the ATR was increased from 866.7 kgmol/hr to 883.5 kgmol/hr, which increased the temperature of the intermediate synthesis gas mixture exiting the ATR to 907.4 degrees Celsius or 1,665.3 degrees Fahrenheit, and increased the temperature of the synthesis gas product exiting the ITM oxidation reactor system to the target temperature of 950.0 degrees Celsius or 1,742.0 degrees Fahrenheit. Further, the increased flow of oxygen to the ATR increased the rate of hydrogen and carbon monoxide generation in the ATR from 4,191.9 kgmol/hr to 4,257.7 kgmol/hr.

The increased operating temperatures within the ITM oxidation reactor system enhanced oxygen permeation through the membranes, which, along with the increased hydrogen and carbon monoxide production in the ATR, compensated for the membrane performance degradation and increased the production rate of the synthesis gas product to 4,584.5 kgmol/hr, which is essentially a full recovery back to the 4,585.6 kgmol/hr production rate of the baseline case.

While the principles of the invention have been described above in connection with preferred embodiments, it is to be clearly understood that this description is made only by way of example and not as a limitation of the scope of the invention.

TABLE 1

| | Baseline simulation conditions | | | | |
|---|---|---|---|---|---|
| | Natural Gas Process Feed | Hydrogen Feed | Steam Feed | Adiabatic Pre-reformer Mixed Feed Inlet | Adiabatic Pre-reformer Mixed Feed Outlet |
| Temperature, ° C. | 37.8 | 37.8 | 257.3 | 510.0 | 441.4 |
| Pressure, bara | 39.6 | 39.6 | 44.8 | 36.9 | 36.5 |
| Total Flow, kmol/h | 1764.5 | 35.3 | 5164.3 | 6964.1 | 7198.2 |
| $CH_4$, mol % | 96.74 | — | — | 24.51 | 22.27 |
| $H_2$, mol % | — | 100 | — | 0.51 | 6.88 |
| CO, mol % | — | — | — | — | 0.02 |
| $CO_2$, mol % | 0.09 | — | — | 0.02 | 1.63 |
| $H_2O$, mol % | — | — | 100 | 74.16 | 68.51 |
| $N_2$, mol % | 2.82 | — | — | 0.71 | 0.69 |
| $O_2$, mol % | — | — | — | — | — |
| Ar, mol % | — | — | — | — | — |
| $C_2H_6$, mol % | 0.32 | — | — | 0.08 | — |
| $C_3H_8$, mol % | 0.03 | — | — | 0.01 | — |

TABLE 1-continued

Baseline simulation conditions

| | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
|---|---|---|---|---|---|
| Temperature, °C. | 537.8 | 842.8 | 950.0 | 343.3 | 424.4 |
| Pressure, bara | 35.9 | 33.8 | 33.1 | 32.7 | 32.4 |
| Total Flow, kmol/h | 7198.2 | 9459.3 | 10204.7 | 10204.7 | 10204.7 |
| $CH_4$, mol % | 22.27 | 4.99 | 0.98 | 0.98 | 0.98 |
| $H_2$, mol % | 6.88 | 45.34 | 48.07 | 48.07 | 55.41 |
| CO, mol % | 0.02 | 7.72 | 10.8 | 10.8 | 3.46 |
| $CO_2$, mol % | 1.63 | 5.48 | 5.09 | 5.09 | 12.43 |
| $H_2O$, mol % | 68.51 | 35.94 | 34.57 | 34.57 | 27.23 |
| $N_2$, mol % | 0.69 | 0.53 | 0.49 | 0.49 | 0.49 |
| $O_2$, mol % | — | — | — | — | — |
| Ar, mol % | — | — | — | — | — |
| $C_2H_6$, mol % | — | — | — | — | — |
| $C_3H_8$, mol % | — | — | — | — | — |

| | Condensed Water Knock-out Effluent | PSA Syngas Inlet | PSA Hydrogen Product | PSA Purge Gas Fuel Feed | Natural Gas Fuel |
|---|---|---|---|---|---|
| Temperature, °C. | 37.8 | 37.8 | 26.7 | 26.7 | 15.6 |
| Pressure, bara | 31.4 | 31.4 | 30.7 | 1.4 | 6.9 |
| Total Flow, kmol/h | 2769.1 | 7435.6 | 5088.4 | 2347.3 | 585.5 |
| $CH_4$, mol % | 0 | 1.34 | — | 4.24 | 96.74 |
| $H_2$, mol % | 0.03 | 76.04 | 100 | 24.09 | — |
| CO, mol % | 0 | 4.75 | — | 15.04 | — |
| $CO_2$, mol % | 0.24 | 16.97 | — | 53.77 | 0.09 |
| $H_2O$, mol % | 99.73 | 0.23 | — | 0.74 | — |
| $N_2$, mol % | 0 | 0.67 | — | 2.12 | 2.82 |
| $O_2$, mol % | — | — | — | — | — |
| Ar, mol % | — | — | — | — | — |
| $C_2H_6$, mol % | — | — | — | — | 0.32 |
| $C_3H_8$, mol % | — | — | — | — | 0.03 |

| | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
|---|---|---|---|---|---|
| Temperature, °C. | 23.8 | 37.8 | 37.8 | 855 | 855.1 |
| Pressure, bara | 1.4 | 1.0 | 1 | 1.7 | 1 |
| Total Flow, kmol/h | 2932.8 | 9504.0 | 11978.7 | 2165.1 | 1914.1 |
| $CH_4$, mol % | 22.71 | — | 0 | — | — |
| $H_2$, mol % | 19.28 | — | 0 | — | — |
| CO, mol % | 12.04 | — | 0 | — | — |
| $CO_2$, mol % | 43.05 | — | 19.08 | — | — |
| $H_2O$, mol % | 0.59 | 0.87 | 16.73 | — | — |
| $N_2$, mol % | 2.26 | 77.32 | 61.9 | 78.12 | 88.37 |
| $O_2$, mol % | — | 20.82 | 1.5 | 20.95 | 10.58 |
| Ar, mol % | — | 0.99 | 0.79 | 0.93 | 1.05 |
| $C_2H_6$, mol % | 0.06 | — | — | — | — |
| $C_3H_8$, mol % | 0.01 | — | — | — | — |

TABLE 2

Simulation data for 25% reduction of steam flow rate

| | Natural Gas Process Feed | Hydrogen Feed | Steam Feed | Adiabatic Pre-reformer Mixed Feed Inlet | Adiabatic Pre-reformer Mixed Feed Outlet |
|---|---|---|---|---|---|
| Temperature, °C. | 37.8 | 37.8 | 257.3 | 510.0 | 442.7 |
| Pressure, bara | 39.6 | 39.6 | 44.8 | 36.9 | 36.5 |
| Total Flow, | 1764.5 | 35.3 | 3873.2 | 5673 | 5865.8 |

TABLE 2-continued

Simulation data for 25% reduction of steam flow rate

| | | | | | |
|---|---|---|---|---|---|
| kmol/h | | | | | |
| CH$_4$, mol % | 96.74 | — | — | 30.09 | 27.68 |
| H$_2$, mol % | — | 100 | — | 0.62 | 7.04 |
| CO, mol % | — | — | — | — | 0.02 |
| CO$_2$, mol % | 0.09 | — | — | 0.03 | 1.65 |
| H$_2$O, mol % | — | — | 100 | 68.27 | 62.77 |
| N$_2$, mol % | 2.82 | — | — | 0.88 | 0.85 |
| O$_2$, mol % | — | — | — | — | — |
| Ar, mol % | — | — | — | — | — |
| C$_2$H$_6$, mol % | 0.32 | — | — | 0.1 | — |
| C$_3$H$_8$, mol % | 0.03 | — | — | 0.01 | — |

| | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
|---|---|---|---|---|---|
| Temperature, °C. | 537.8 | 870.4 | 1098.9 | 343.3 | 442.8 |
| Pressure, bara | 35.9 | 33.8 | 33.1 | 32.7 | 32.4 |
| Total Flow, kmol/h | 5865.8 | 8095.6 | 9079.1 | 9079.1 | 9079.1 |
| CH$_4$, mol % | 27.68 | 6.28 | 0.19 | 0.19 | 0.19 |
| H$_2$, mol % | 7.04 | 49.96 | 52.07 | 52.07 | 60.85 |
| CO, mol % | 0.02 | 10.24 | 14.97 | 14.97 | 6.18 |
| CO$_2$, mol % | 1.65 | 4.74 | 3.81 | 3.81 | 12.59 |
| H$_2$O, mol % | 62.77 | 28.16 | 28.43 | 28.43 | 19.64 |
| N$_2$, mol % | 0.85 | 0.61 | 0.55 | 0.55 | 0.55 |
| O$_2$, mol % | — | — | — | — | — |
| Ar, mol % | — | — | — | — | — |
| C$_2$H$_6$, mol % | — | — | — | — | — |
| C$_3$H$_8$, mol % | — | — | — | — | — |

| | Condensed Water Knock-out Effluent | PSA Syngas Inlet | PSA Hydrogen Product | PSA Purge Gas Fuel Feed | Natural Gas Fuel |
|---|---|---|---|---|---|
| Temperature, °C. | 37.8 | 37.8 | 26.7 | 26.7 | 15.6 |
| Pressure, bara | 31.4 | 31.4 | 30.7 | 1.4 | 6.9 |
| Total Flow, kmol/h | 1770.3 | 7308.8 | 4971.9 | 2336.8 | 585.5 |
| CH$_4$, mol % | 0 | 0.23 | — | 0.72 | 96.74 |
| H$_2$, mol % | 0.03 | 75.59 | 100 | 23.64 | — |
| CO, mol % | 0 | 7.68 | — | 24.02 | — |
| CO$_2$, mol % | 0.22 | 15.59 | — | 48.76 | 0.09 |
| H$_2$O, mol % | 99.75 | 0.23 | — | 0.73 | — |
| N$_2$, mol % | 0 | 0.68 | — | 2.13 | 2.82 |
| O$_2$, mol % | — | — | — | — | — |
| Ar, mol % | — | — | — | — | — |
| C$_2$H$_6$, mol % | — | — | — | — | 0.32 |
| C$_3$H$_8$, mol % | — | — | — | — | 0.03 |

| | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
|---|---|---|---|---|---|
| Temperature, °C. | 23.8 | 37.8 | 37.8 | 855 | 855.1 |
| Pressure, bara | 1.4 | 1.0 | 1 | 1.7 | 1 |
| Total Flow, kmol/h | 2922.4 | 9145.8 | 11512.4 | 2165.1 | 1787.9 |
| CH$_4$, mol % | 19.96 | — | 0 | — | — |
| H$_2$, mol % | 18.9 | — | 0 | — | — |
| CO, mol % | 19.21 | — | 0 | — | — |
| CO$_2$, mol % | 39.01 | — | 19.88 | — | — |
| H$_2$O, mol % | 0.59 | 0.87 | 15.83 | — | — |
| N$_2$, mol % | 2.27 | 77.32 | 62 | 78.12 | 94.6 |
| O$_2$, mol % | — | 20.82 | 1.5 | 20.95 | 4.27 |
| Ar, mol % | — | 0.99 | 0.79 | 0.93 | 1.13 |
| C$_2$H$_6$, mol % | 0.06 | — | — | — | — |
| C$_3$H$_8$, mol % | 0.01 | — | — | — | — |

TABLE 3

| Simulation data for 25% reduction of fuel flow rate | | | | | |
|---|---|---|---|---|---|
| | Natural Gas Process Feed | Hydrogen Feed | Steam Feed | Adiabatic Pre-reformer Mixed Feed Inlet | Adiabatic Pre-reformer Mixed Feed Outlet |
| Temperature, °C. | 37.8 | 37.8 | 257.3 | 510.0 | 441.4 |
| Pressure, bara | 39.6 | 39.6 | 44.8 | 36.9 | 36.5 |
| Total Flow, kmol/h | 1764.5 | 35.3 | 5164.3 | 6964.1 | 7198.2 |
| $CH_4$, mol % | 96.74 | — | — | 24.551 | 22.27 |
| $H_2$, mol % | — | 100 | — | 0.51 | 6.88 |
| CO, mol % | — | — | — | — | 0.02 |
| $CO_2$, mol % | 0.09 | — | — | 0.02 | 1.63 |
| $H_2O$, mol % | — | — | 100 | 74.16 | 68.51 |
| $N_2$, mol % | 2.82 | — | — | 0.71 | 0.69 |
| $O_2$, mol % | — | — | — | — | — |
| Ar, mol % | — | — | — | — | — |
| $C_2H_6$, mol % | 0.32 | — | — | 0.08 | — |
| $C_3H_8$, mol % | 0.03 | — | — | 0.01 | — |
| | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
| Temperature, °C. | 537.8 | 827.5 | 902.2 | 343.3 | 417.4 |
| Pressure, bara | 35.9 | 33.8 | 33.1 | 32.7 | 32.4 |
| Total Flow, kmol/h | 7198.2 | 9335.2 | 9999.3 | 9999.3 | 9999.3 |
| $CH_4$, mol % | 22.27 | 5.27 | 2.02 | 2.02 | 2.02 |
| $H_2$, mol % | 6.88 | 44.01 | 47.12 | 47.12 | 53.89 |
| CO, mol % | 0.02 | 7.09 | 9.75 | 9.75 | 2.99 |
| $CO_2$, mol % | 1.63 | 5.62 | 5.44 | 5.44 | 12.21 |
| $H_2O$, mol % | 68.51 | 37.01 | 35.17 | 35.17 | 28.4 |
| $N_2$, mol % | 0.69 | 0.53 | 0.5 | 0.5 | 0.5 |
| $O_2$, mol % | — | — | — | — | — |
| Ar, mol % | — | — | — | — | — |
| $C_2H_6$, mol % | — | — | — | — | — |
| $C_3H_8$, mol % | — | — | — | — | — |
| | Condensed Water Knock-out Effluent | PSA Syngas Inlet | PSA Hydrogen Product | PSA Purge Gas Fuel Feed | Natural Gas Fuel |
| Temperature, °C. | 37.8 | 37.8 | 26.7 | 26.7 | 15.6 |
| Pressure, bara | 31.4 | 31.4 | 30.7 | 1.4 | 6.9 |
| Total Flow, kmol/h | 2830.5 | 7168.9 | 4849.9 | 2319.9 | 439.1 |
| $CH_4$, mol % | 0 | 2.82 | — | 8.72 | 96.74 |
| $H_2$, mol % | 0.03 | 75.15 | 100 | 23.22 | — |
| CO, mol % | 0 | 4.16 | — | 12.87 | — |
| $CO_2$, mol % | 0.24 | 16.93 | — | 52.32 | 0.09 |
| $H_2O$, mol % | 99.73 | 0.23 | — | 0.72 | — |
| $N_2$, mol % | 0 | 0.69 | — | 2.14 | 2.82 |
| $O_2$, mol % | — | — | — | — | — |
| Ar, mol % | — | — | — | — | — |
| $C_2H_6$, mol % | — | — | — | — | 0.32 |
| $C_3H_8$, mol % | — | — | — | — | 0.03 |
| | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
| Temperature, °C. | 24.4 | 37.8 | 37.8 | 855 | 855.1 |
| Pressure, bara | 1.4 | 1.0 | 1 | 1.7 | 1 |
| Total Flow, kmol/h | 2759.1 | 8868.2 | 11209.5 | 2165.1 | 1959.2 |
| $CH_4$, mol % | 22.73 | — | 0 | — | — |
| $H_2$, mol % | 19.53 | — | 0 | — | — |
| CO, mol % | 10.82 | — | 0 | — | — |
| $CO_2$, mol % | 44.01 | — | 19.12 | — | — |
| $H_2O$, mol % | 0.61 | 0.87 | 16.88 | — | — |
| $N_2$, mol % | 2.25 | 77.32 | 61.72 | 78.12 | 86.33 |

TABLE 3-continued

Simulation data for 25% reduction of fuel flow rate

| | | | | | |
|---|---|---|---|---|---|
| O$_2$, mol % | — | 20.82 | 1.5 | 20.95 | 12.64 |
| Ar, mol % | — | 0.99 | 0.78 | 0.93 | 1.03 |
| C$_2$H$_6$, mol % | 0.05 | — | — | — | — |
| C$_3$H$_8$, mol % | 0 | — | — | — | — |

TABLE 4

Simulation data for 25% reduction of process feed flow rate

| | Natural Gas Process Feed | Hydrogen Feed | Steam Feed | Adiabatic Pre-reformer Mixed Feed Inlet | Adiabatic Pre-reformer Mixed Feed Outlet |
|---|---|---|---|---|---|
| Temperature, ° C. | 37.8 | 37.8 | 257.3 | 510.0 | 440.7 |
| Pressure, bara | 39.6 | 39.6 | 44.8 | 36.9 | 36.5 |
| Total Flow, kmol/h | 1323.4 | 26.5 | 5164.3 | 6514.2 | 6729.4 |
| CH$_4$, mol % | 96.74 | — | — | 19.65 | 17.57 |
| H$_2$, mol % | — | 100 | — | 0.41 | 6.7 |
| CO, mol % | — | — | — | — | 0.02 |
| CO$_2$, mol % | 0.09 | — | — | 0.02 | 1.6 |
| H$_2$O, mol % | — | — | 100 | 79.28 | 73.56 |
| N$_2$, mol % | 2.82 | — | — | 0.57 | 0.55 |
| O$_2$, mol % | — | — | — | — | — |
| Ar, mol % | — | — | — | — | — |
| C$_2$H$_6$, mol % | 0.32 | — | — | 0.07 | — |
| C$_3$H$_8$, mol % | 0.03 | — | — | 0.01 | — |

| | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
|---|---|---|---|---|---|
| Temperature, ° C. | 537.8 | 829.8 | 1023.8 | 343.3 | 418.2 |
| Pressure, bara | 35.9 | 33.8 | 33.1 | 32.7 | 32.4 |
| Total Flow, kmol/h | 6729.4 | 8527.5 | 9072.1 | 9072.1 | 9072.1 |
| CH$_4$, mol % | 17.57 | 3.32 | 0.12 | 0.12 | 0.12 |
| H$_2$, mol % | 6.7 | 41.47 | 41.89 | 41.89 | 48.8 |
| CO, mol % | 0.02 | 6 | 9 | 9 | 2.1 |
| CO$_2$, mol % | 1.6 | 5.82 | 5.11 | 5.11 | 12.02 |
| H$_2$O, mol % | 73.56 | 42.95 | 43.47 | 43.47 | 36.56 |
| N$_2$, mol % | 0.55 | 0.44 | 0.41 | 0.41 | 0.41 |
| O$_2$, mol % | — | — | — | — | — |
| Ar, mol % | — | — | — | — | — |
| C$_2$H$_6$, mol % | — | — | — | — | — |
| C$_3$H$_8$, mol % | — | — | — | — | — |

| | Condensed Water Knock-out Effluent | PSA Syngas Inlet | PSA Hydrogen Product | PSA Purge Gas Fuel Feed | Natural Gas Fuel |
|---|---|---|---|---|---|
| Temperature, ° C. | 37.8 | 37.8 | 26.7 | 26.7 | 15.6 |
| Pressure, bara | 31.4 | 31.4 | 30.7 | 1.4 | 6.9 |
| Total Flow, kmol/h | 3313.1 | 5759 | 3983.4 | 1775.6 | 585.5 |
| CH$_4$, mol % | 0 | 0.19 | — | 0.61 | 96.74 |
| H$_2$, mol % | 0.03 | 76.85 | 100 | 24.93 | — |
| CO, mol % | 0 | 3.3 | — | 10.71 | — |
| CO$_2$, mol % | 0.26 | 18.78 | — | 60.89 | 0.09 |
| H$_2$O, mol % | 99.7 | 0.23 | — | 0.76 | |
| N$_2$, mol % | 0 | 0.65 | — | 2.1 | 2.82 |
| O$_2$, mol % | — | — | — | — | — |
| Ar, mol % | — | — | — | — | — |
| C$_2$H$_6$, mol % | — | — | — | — | 0.32 |
| C$_3$H$_8$, mol % | — | — | — | — | 0.03 |

TABLE 4-continued

Simulation data for 25% reduction of process feed flow rate

|  | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
|---|---|---|---|---|---|
| Temperature, °C | 23.2 | 37.8 | 37.8 | 855 | 855.1 |
| Pressure, bara | 1.4 | 1.0 | 1 | 1.7 | 1 |
| Total Flow, kmol/h | 2361.2 | 7812.5 | 9858.4 | 2165.1 | 1905.0 |
| $CH_4$, mol % | 24.45 | — | — | — | — |
| $H_2$, mol % | 18.74 | — | — | — | — |
| CO, mol % | 8.05 | — | — | — | — |
| $CO_2$, mol % | 45.82 | — | 18.8 | — | — |
| $H_2O$, mol % | 0.57 | 0.87 | 17.09 | — | — |
| $N_2$, mol % | 2.28 | 77.32 | 61.82 | 78.12 | 88.79 |
| $O_2$, mol % | — | 20.82 | 1.5 | 20.95 | 10.16 |
| Ar, mol % | — | 0.99 | 0.79 | 0.93 | 1.06 |
| $C_2H_6$, mol % | 0.08 | — | — | — | — |
| $C_3H_8$, mol % | 0.01 | — | — | — | — |

TABLE 5

Simulation data for turndown operating conditions

|  | Natural Gas Process Feed | Hydrogen Feed | Steam Feed | Adiabatic Pre-reformer Mixed Feed Inlet | Adiabatic Pre-reformer Mixed Feed Outlet |
|---|---|---|---|---|---|
| Temperature, °C | 37.8 | 37.8 | 257.3 | 510.0 | 441.4 |
| Pressure, bara | 39.6 | 39.6 | 44.8 | 36.9 | 36.5 |
| Total Flow, kmol/h | 1323.4 | 26.5 | 3873.2 | 5223.1 | 5398.6 |
| $CH_4$, mol % | 96.74 | — | — | 24.51 | 6.88 |
| $H_2$, mol % | — | 100 | — | 0.51 | 0.02 |
| CO, mol % | — | — | — | — | — |
| $CO_2$, mol % | 0.09 | — | — | 0.02 | 1.63 |
| $H_2O$, mol % | — | — | 100 | 74.16 | 68.51 |
| $N_2$, mol % | 2.82 | — | — | 0.71 | 0.69 |
| $O_2$, mol % | — | — | — | — | — |
| Ar, mol % | — | — | — | — | — |
| $C_2H_6$, mol % | 0.32 | — | — | 0.08 | — |
| $C_3H_8$, mol % | 0.03 | — | — | 0.01 | — |

|  | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
|---|---|---|---|---|---|
| Temperature, °C | 537.8 | 824.4 | 950 | 343.3 | 424.2 |
| Pressure, bara | 35.9 | 33.8 | 33.1 | 32.7 | 32.4 |
| Total Flow, kmol/h | 5398.6 | 6981.8 | 7664 | 7664 | 7664 |
| $CH_4$, mol % | 22.27 | 5.88 | 0.91 | 0.91 | 0.91 |
| $H_2$, mol % | 6.88 | 43.72 | 47.36 | 47.36 | 54.71 |
| CO, mol % | 0.02 | 6.96 | 10.71 | 10.71 | 3.36 |
| $CO_2$, mol % | 1.63 | 5.65 | 5.23 | 5.23 | 12.58 |
| $H_2O$, mol % | 68.51 | 37.25 | 35.31 | 35.31 | 27.96 |
| $N_2$, mol % | 0.69 | 0.53 | 0.49 | 0.49 | 0.49 |
| $O_2$, mol % | — | — | — | — | — |
| Ar, mol % | — | — | — | — | — |
| $C_2H_6$, mol % | — | — | — | — | — |
| $C_3H_8$, mol % | — | — | — | — | — |

|  | Condensed Water Knock-out Effluent | PSA Syngas Inlet | PSA Hydrogen Product | PSA Purge Gas Fuel Feed | Natural Gas Fuel |
|---|---|---|---|---|---|
| Temperature, °C | 37.8 | 37.8 | 26.7 | 26.7 | 15.6 |
| Pressure, bara | 31.4 | 31.4 | 30.7 | 1.4 | 6.9 |

TABLE 5-continued

Simulation data for turndown operating conditions

|  | | | | | |
|---|---|---|---|---|---|
| Total Flow, kmol/h | 2135.8 | 5528.2 | 3772.9 | 1775.3 | 390 |
| $CH_4$, mol % | 0 | 1.26 | — | 3.95 | 96.74 |
| $H_2$, mol % | 0.03 | 75.83 | 100 | 23.88 | — |
| CO, mol % | 0 | 4.66 | — | 14.68 | — |
| $CO_2$, mol % | 0.24 | 17.34 | — | 54.62 | 0.09 |
| $H_2O$, mol % | 99.72 | 0.23 | — | 0.74 | — |
| $N_2$, mol % | 0 | 0.67 | — | 2.13 | 2.82 |
| $O_2$, mol % | — | — | — | — | — |
| Ar, mol % | — | — | — | — | — |
| $C_2H_6$, mol % | — | — | — | — | 0.32 |
| $C_3H_8$, mol % | — | — | — | — | 0.03 |

|  | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
|---|---|---|---|---|---|
| Temperature, °C. | 24.1 | 37.8 | 37.8 | 855 | 855.1 |
| Pressure, bara | 1.4 | 1.0 | 1 | 1.7 | 1 |
| Total Flow, mol/h | 2145.3 | 6535.7 | 8343.3 | 2165.1 | 1938.7 |
| $CH_4$, mol % | 20.82 | — | — | — | — |
| $H_2$, mol % | 19.54 | — | — | — | — |
| CO, mol % | 12.01 | — | — | — | — |
| $CO_2$, mol % | 44.70 | — | 19.97 | — | — |
| $H_2O$, mol % | 0.60 | 0.87 | 16.62 | — | — |
| $N_2$, mol % | 2.25 | 77.32 | 61.15 | 78.12 | 87.24 |
| $O_2$, mol % | — | 20.82 | 1.48 | 20.95 | 11.72 |
| Ar, mol % | — | 0.99 | 0.78 | 0.93 | 1.04 |
| $C_2H_6$, mol % | 0.06 | — | — | — | — |
| $C_3H_8$, mol % | 0.01 | — | — | — | — |

TABLE 6

Simulation data for 20% degradation of membrane performance

|  | Natural Gas Process Feed | Hydrogen Feed | Steam Feed | Adiabatic Pre-reformer Mixed Feed Inlet | Adiabatic Pre-reformer Mixed Feed Outlet |
|---|---|---|---|---|---|
| Temperature, °C. | 37.8 | 37.8 | 257.3 | 510.0 | 441.4 |
| Pressure, bara | 39.6 | 39.6 | 44.8 | 36.9 | 36.5 |
| Total Flow, kmol/h | 1764.5 | 35.3 | 5164.3 | 6964.1 | 7198.2 |
| $CH_4$, mol % | 96.74 | — | — | 24.51 | 22.27 |
| $H_2$, mol % | — | 100 | — | 0.51 | 6.88 |
| CO, mol % | — | — | — | — | 0.02 |
| $CO_2$, mol % | 0.09 | — | — | 0.02 | 1.63 |
| $H_2O$, mol % | — | — | 100 | 74.16 | 68.51 |
| $N_2$, mol % | 2.82 | — | — | 0.71 | 0.69 |
| $O_2$, mol % | — | — | — | — | — |
| Ar, mol % | — | — | — | — | — |
| $C_2H_6$, mol % | 0.32 | — | — | 0.08 | — |
| $C_3H_8$, mol % | 0.03 | — | — | 0.01 | — |

|  | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
|---|---|---|---|---|---|
| Temperature, °C. | 537.8 | 824.4 | 912.3 | 343.3 | 419.1 |
| Pressure, bara | 35.9 | 33.8 | 33.1 | 32.7 | 32.4 |
| Total Flow, kmol/h | 7198.2 | 9459.3 | 10038.2 | 10038.2 | 10038.2 |
| $CH_4$, mol % | 22.27 | 4.99 | 1.82 | 1.82 | 1.82 |
| $H_2$, mol % | 6.88 | 45.34 | 47.82 | 47.82 | 54.72 |
| CO, mol % | 0.02 | 7.72 | 10.06 | 10.06 | 3.15 |
| $CO_2$, mol % | 1.63 | 5.48 | 5.23 | 5.27 | 12.17 |
| $H_2O$, mol % | 68.51 | 35.94 | 34.53 | 34.53 | 27.63 |
| $N_2$, mol % | 0.69 | 0.53 | 0.50 | 0.50 | 0.50 |

TABLE 6-continued

| Simulation data for 20% degradation of membrane performance | | | | | |
|---|---|---|---|---|---|
| $O_2$, mol % | — | — | — | — | — |
| Ar, mol % | — | — | — | — | — |
| $C_2H_6$, mol % | — | — | — | — | — |
| $C_3H_8$, mol % | — | — | — | — | — |

| | Condensed Water Knock-out Effluent | PSA Syngas Inlet | PSA Hydrogen Product | PSA Purge Gas Fuel Feed | Natural Gas Fuel |
|---|---|---|---|---|---|
| Temperature, °C. | 37.8 | 37.8 | 26.7 | 26.7 | 15.6 |
| Pressure, bara | 31.4 | 31.4 | 30.7 | 1.4 | 6.9 |
| Total Flow, kmol/h | 2764.0 | 7274.2 | 4943.3 | 2330.9 | 515.1 |
| $CH_4$, mol % | 0 | 2.51 | — | 7.84 | 96.74 |
| $H_2$, mol % | 0.03 | 75.51 | 100 | 23.56 | — |
| CO, mol % | 0 | 4.35 | — | 13.58 | — |
| $CO_2$, mol % | 0.24 | 16.71 | — | 52.15 | 0.09 |
| $H_2O$, mol % | 99.73 | 0.23 | — | 0.73 | — |
| $N_2$, mol % | 0 | 0.68 | — | 2.13 | 2.82 |
| $O_2$, mol % | — | — | — | — | — |
| Ar, mol % | — | — | — | — | — |
| $C_2H_6$, mol % | — | — | — | — | 0.32 |
| $C_3H_8$, mol % | — | — | — | — | 0.03 |

| | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
|---|---|---|---|---|---|
| Temperature, °C. | 24.1 | 37.8 | 37.8 | 855 | 855.1 |
| Pressure, bara | 1.4 | 1.0 | 1 | 1.7 | 1 |
| Total Flow, mol/h | 2846 | 9519.5 | 11933.5 | 2165.1 | 1981.7 |
| $CH_4$, mol % | 23.93 | — | — | — | — |
| $H_2$, mol % | 19.3 | — | — | — | — |
| CO, mol % | 11.12 | — | — | — | — |
| $CO_2$, mol % | 42.73 | — | 18.58 | — | — |
| $H_2O$, mol % | 0.6 | 0.87 | 16.9 | — | — |
| $N_2$, mol % | 2.26 | 77.32 | 62.22 | 78.12 | 85.35 |
| $O_2$, mol % | — | 20.82 | 1.51 | 20.95 | 13.63 |
| Ar, mol % | — | 0.99 | 0.79 | 0.93 | 1.02 |
| $C_2H_6$, mol % | 0.06 | — | — | — | — |
| $C_3H_8$, mol % | 0.01 | — | — | — | — |

TABLE 7

| Simulation data for recovery/compensation for degradation of membrane performance | | | | | |
|---|---|---|---|---|---|
| | Natural Gas Process Feed | Hydrogen Feed | Steam Feed | Adiabatic Pre-reformer Mixed Feed Inlet | Adiabatic Pre-reformer Mixed Feed Outlet |
| Temperature, °C. | 37.8 | 37.8 | 257.3 | 510.0 | 441.4 |
| Pressure, bara | 39.6 | 39.6 | 44.8 | 36.9 | 36.5 |
| Total Flow, kmol/h | 1751.3 | 35.3 | 5164.3 | 6912.2 | 7144.2 |
| $CH_4$, mol % | 96.74 | — | — | 24.51 | 22.27 |
| $H_2$, mol % | — | 100 | — | 0.51 | 6.88 |
| CO, mol % | — | — | — | — | 0.02 |
| $CO_2$, mol % | 0.09 | — | — | 0.02 | 1.63 |
| $H_2O$, mol % | — | — | 100 | 74.16 | 68.51 |
| $N_2$, mol % | 2.82 | — | — | 0.71 | 0.69 |
| $O_2$, mol % | — | — | — | — | — |
| Ar, mol % | — | — | — | — | — |
| $C_2H_6$, mol % | 0.32 | — | — | 0.08 | — |
| $C_3H_8$, mol % | 0.03 | — | — | 0.01 | — |

TABLE 7-continued

Simulation data for recovery/compensation for degradation of membrane performance

|  | Fired Tubular Reformer Mixed Feed Inlet | Fired Tubular Reformer Mixed Feed Outlet | Membrane Oxidation Reactor Syngas Outlet | HTS Syngas Inlet | HTS Syngas Outlet |
|---|---|---|---|---|---|
| Temperature, °C | 537.8 | 824.4 | 912.3 | 343.3 | 419.1 |
| Pressure, bara | 35.9 | 33.8 | 33.1 | 32.7 | 32.4 |
| Total Flow, kmol/h | 7144.5 | 9487.6 | 10118.7 | 10118.7 | 10118.7 |
| $CH_4$, mol % | 22.27 | 4.42 | 1.03 | 1.03 | 1.03 |
| $H_2$, mol % | 6.88 | 46.36 | 48.54 | 48.54 | 55.88 |
| CO, mol % | 0.02 | 8.23 | 10.86 | 10.86 | 3.53 |
| $CO_2$, mol % | 1.63 | 5.36 | 5 | 5 | 1.233 |
| $H_2O$, mol % | 68.51 | 35.11 | 34.08 | 34.08 | 26.75 |
| $N_2$, mol % | 0.69 | 0.52 | 0.49 | 0.49 | 0.49 |
| $O_2$, mol % | — | — | — | — | — |
| Ar, mol % | — | — | — | — | — |
| $C_2H_6$, mol % | — | — | — | — | — |
| $C_3H_8$, mol % | — | — | — | — | — |

|  | Condensed Water Knock-out Effluent | PSA Syngas Inlet | PSA Hydrogen Product | PSA Purge Gas Fuel Feed | Natural Gas Fuel |
|---|---|---|---|---|---|
| Temperature, °C | 37.8 | 37.8 | 26.7 | 26.7 | 15.6 |
| Pressure, bara | 31.4 | 31.4 | 30.7 | 1.4 | 6.9 |
| Total Flow, kmol/h | 2696.1 | 7422.6 | 5088.3 | 2334.3 | 626.7 |
| $CH_4$, mol % | 0 | 1.4 | — | 4.44 | 96.74 |
| $H_2$, mol % | 0.03 | 76.17 | 100 | 24.22 | — |
| CO, mol % | 0 | 4.81 | — | 15.28 | — |
| $CO_2$, mol % | 0.24 | 16.73 | — | 53.19 | 0.09 |
| $H_2O$, mol % | 99.73 | 0.23 | — | 0.74 | — |
| $N_2$, mol % | 0 | 0.67 | — | 2.12 | 2.82 |
| $O_2$, mol % | — | — | — | — | — |
| Ar, mol % | — | — | — | — | — |
| $C_2H_6$, mol % | — | — | — | — | 0.32 |
| $C_3H_8$, mol % | — | — | — | — | 0.03 |

|  | Fired Tubular Reformer Total Combustion Fuel Feed | Fired Tubular Reformer Combustion Air Feed | Fired Tubular Reformer Combusted Flue Gas Effluent | Membrane Oxidation Reactor Air Reactor Feed | Membrane Oxidation Non-Permeate Effluent |
|---|---|---|---|---|---|
| Temperature, °C | 23.6 | 37.8 | 37.8 | 855 | 855.1 |
| Pressure, bara | 1.4 | 1.0 | 1 | 1.7 | 1 |
| Total Flow, mol/h | 2961 | 9981.3 | 12482.4 | 2165.1 | 1950 |
| $CH_4$, mol % | 23.93 | — | — | — | — |
| $H_2$, mol % | 19.09 | — | — | — | — |
| CO, mol % | 12.05 | — | — | — | — |
| $CO_2$, mol % | 41.96 | — | 18.58 | — | — |
| $H_2O$, mol % | 0.59 | 0.87 | 16.80 | — | — |
| $N_2$, mol % | 2.26 | 77.32 | 62.36 | 78.12 | 86.74 |
| $O_2$, mol % | — | 20.82 | 1.51 | 20.95 | 12.23 |
| Ar, mol % | — | 0.99 | 0.79 | 0.93 | 1.03 |
| $C_2H_6$, mol % | 0.07 | — | — | — | — |
| $C_3H_8$, mol % | 0.01 | — | — | — | — |

TABLE 8

Comparative summary of simulations of Tables 1-7

|  | Table 1 Baseline | Table 2 25% red. of steam flow rate | Table 3 25% red. of fuel flow rate | Table 4 25% red. of process feed flow rate |
|---|---|---|---|---|
| Natural gas process feed, kmol/h | 1764.5 | 1764.5 | 1764.5 | 1323.4 |
| $H_2$ feed, kmol/h | 35.3 | 35.3 | 35.3 | 26.5 |
| Steam feed, kmol/h | 5164.3 | 3873.2 | 5164.3 | 5164.3 |

TABLE 8-continued

Comparative summary of simulations of Tables 1-7

| | | | | |
|---|---|---|---|---|
| Reactant feed mixture Steam-to-Carbon molar ratio | 3.0 | 2.25 | 3.0 | 4.0 |
| Natural gas fuel feed, MMBtu/h | 482 | 482 | 361 | 482 |
| PSA purge gas fuel feed, MMBtu/h | 333 | 315 | 398 | 181 |
| Total combustion fuel to fired tubular reformer, MMBtu/h | 815 | 797 | 759 | 663 |
| Combustion air feed to fired tubular reformer, kmol/h | 9503.9 | 9145.7 | 8868.1 | 7812.4 |
| Excess combustion air to fired tubular reformer, % | 10 | 10 | 10 | 10 |
| Absorbed Duty in fired tubular reformer, MMBtu/h | 330 | 322 | 311 | 267 |
| Air feed to MOR system, kmol/h | 2165.1 | 2165.1 | 2165.1 | 2165.1 |
| Total $O_2$ permeation in MOR system, kmol/h | 251.1 | 377.3 | 206 | 260.1 |
| $O_2$ recovery in MOR system, % | 55 | 83 | 45 | 57 |
| $H_2$ production, kmol/h | 5088.3 | 4971.9 | 4848.9 | 3983.4 |

| | Table 5 Turndown conditions | Table 6 20% degradation of membrane performance | Table 7 Recovery/comp. for degradation of membrane performance |
|---|---|---|---|
| Natural gas process feed, kmol/h | 1323.4 | 1764.5 | 1751.3 |
| $H_2$ feed, kmol/h | 26.5 | 35.3 | 35.0 |
| Steam feed, kmol/h | 3873.2 | 5164.3 | 5125.8 |
| Reactant feed mixture Steam-to-Carbon molar ratio | 3 | 3 | 3 |
| Natural gas fuel feed, MMBtu/h | 321 | 424 | 516 |
| PSA purge gas fuel feed, MMBtu/h | 242 | 389 | 338 |
| Total combustion fuel to fired tubular reformer, MMBtu/h | 563 | 813 | 853 |
| Combustion air feed to fired tubular reformer, kmol/h | 6535.7 | 9519.4 | 9981.2 |
| Excess combustion air to fired tubular reformer, % | 10 | 10 | 10 |
| Absorbed Duty in fired tubular reformer, MMBtu/h | 230 | 330 | 342 |
| Air feed to *MOR system, kmol/h | 2165.1 | 2165.1 | 2165.1 |
| Total $O_2$ permeation in MOR system, kmol/h | 226.4 | 183.5 | 215.1 |
| $O_2$ recovery in MOR system, % | 50 | 40 | 47 |
| $H_2$ production, kmol/h | 3772.8 | 4943.2 | 5088.3 |

| | Table 1 Baseline | Table 2 25% red. of steam flow rate | Table 3 25% red. of fuel flow rate | Table 4 25% red. of process feed flow rate |
|---|---|---|---|---|
| Reactor temperatures | | | | |
| Adiabatic prereformer mixed feed inlet, ° C. | 510.0 | 510.0 | 510.0 | 510.0 |
| Adiabatic prereformer effluent, ° C. | 441.4 | 442.7 | 441.4 | 440.7 |
| Fired tubular reformer mixed feed inlet, ° C. | 537.8 | 537.8 | 537.8 | 537.8 |
| Fired tubular reformer effluent, ° C. | 842.9 | 870.4 | 827.5 | 829.8 |
| MOR mixed feed inlet, ° C. | 842.9 | 870.4 | 827.5 | 829.8 |
| MOR syngas effluent, ° C. | 950.0 | 1098.9 | 902.2 | 1023.8 |
| Shift reactor syngas inlet, ° C. | 343.3 | 343.3 | 343.3 | 343.3 |
| Shift reactor syngas effluent, ° C. | 424.4 | 442.8 | 417.4 | 418.2 |

| | Table 5 Turndown conditions | Table 6 20% degrad. of membrane performance | Table 7 Recovery/comp. for degr. of membrane performance |
|---|---|---|---|
| Reactor Temperatures | | | |
| Adiabatic prereformer mixed feed inlet, ° C. | 510.0 | 510.0 | 510.0 |
| Adiabatic prereformer effluent, ° C. | 441.4 | 441.4 | 441.4 |

TABLE 8-continued

Comparative summary of simulations of Tables 1-7

| | | | |
|---|---|---|---|
| Fired tubular reformer mixed feed inlet, °C. | 537.8 | 537.8 | 537.8 |
| Fired tubular reformer effluent, °C. | 824.4 | 842.9 | 855.6 |
| MOR mixed feed inlet, °C. | 824.4 | 842.9 | 855.6 |
| MOR syngas effluent, °C. | 950.0 | 912.3 | 950.0 |
| Shift reactor syngas inlet, °C. | 343.3 | 343.3 | 343.3 |
| Shift reactor syngas effluent, °C. | 424.2 | 419.1 | 424.5 |

| | Table 1 Baseline | Table 2 25% red. of steam flow rate | Table 3 25% red. of fuel flow rate | Table 4 25% red. of process feed flow rate |
|---|---|---|---|---|
| $H_2$ Generation and Recovery | | | | |
| $H_2$ in mixed feed to prereformer, kmol/h | 35.3 | 35.3 | 35.3 | 26.5 |
| $H_2$ in mixed feed to tubular reformer, kmol/h | 495.3 | 412.8 | 495.3 | 450.7 |
| $H_2$ in mixed feed to MOR, kmol/h | 4288.4 | 4044.6 | 4108.6 | 3536.2 |
| $H_2$ in syngas effluent from MOR, kmol/h | 4905.3 | 4727.1 | 4711.7 | 3800.4 |
| $H_2$ in syngas feed to PSA, kmol/h | 5653.7 | 5524.3 | 5387.6 | 4425.9 |
| $H_2$ product from PSA, kmol/h | 5088.3 | 4971.9 | 4848.9 | 3983.4 |
| $H_2$ generation in adiabatic prereformer, kmol/h | 460.0 | 377.5 | 460.0 | 424.3 |
| $H_2$ generation in fired tubular reformer, kmol/h | 3793.2 | 3631.9 | 3613.3 | 3085.4 |
| $H_2$ generation in MOR, kmol/h | 616.8 | 682.4 | 603.2 | 264.2 |
| $H_2$ generation in shift reactor, kmol/h | 748.4 | 797.2 | 675.9 | 625.6 |
| $H_2$ recovery in PSA, % | 90 | 90 | 90 | 90 |

| | Table 5 Turndown conditions | Table 6 20% degrad. of membrane performance | Table 7 Recovery/comp. for degr. of membrane performance |
|---|---|---|---|
| $H_2$ Generation and Recovery | | | |
| $H_2$ in mixed feed to prereformer, kmol/h | 26.5 | 35.3 | 35.0 |
| $H_2$ in mixed feed to tubular reformer, kmol/h | 371.5 | 495.3 | 491.6 |
| $H_2$ in mixed feed to MOR, kmol/h | 3052.7 | 4288.4 | 4398.4 |
| $H_2$ in syngas effluent from MOR, kmol/h | 3629.7 | 4800.4 | 4912.0 |
| $H_2$ in syngas feed to PSA, kmol/h | 4192.1 | 5492.5 | 5653.6 |
| $H_2$ product from PSA, kmol/h | 3772.8 | 4943.2 | 5088.3 |
| $H_2$ generation in adiabatic prereformer, kmol/h | 345.0 | 460.0 | 456.6 |
| $H_2$ generation in fired tubular reformer, kmol/h | 2681.3 | 3793.2 | 3906.8 |
| $H_2$ generation in MOR, kmol/h | 577.0 | 512.0 | 513.6 |
| $H_2$ generation in shift reactor, kmol/h | 562.3 | 692.0 | 741.6 |
| $H_2$ recovery in PSA, % | 90 | 90 | 90 |

*MOR—Membrane Oxidation Reactor

TABLE 9

Baseline simulation conditions

| | Natural gas process feed | $H_2$ feed | Steam feed | ATR mixed feed inlet | ATR $O_2$ feed inlet |
|---|---|---|---|---|---|
| Temperature, °C. | 37.8 | 37.8 | 257.3 | 510.0 | 148.9 |
| Pressure, bara | 39.6 | 39.6 | 44.8 | 36.9 | 41.4 |
| Total flow, kmol/h | 1764.5 | 35.3 | 2582.2 | 4381.9 | 866.7 |
| $CH_4$, mol % | 96.74 | — | — | 38.95 | — |
| $H_2$, mol % | — | 100 | — | 0.81 | — |
| CO, mol % | — | — | — | — | — |
| $CO_2$, mol % | 0.09 | — | — | 0.04 | — |
| $H_2O$, mol % | — | — | 100 | 58.93 | — |
| $N_2$, mol % | 2.82 | — | — | 1.14 | — |
| $O_2$, mol % | — | — | — | — | 100 |
| Ar, mol % | — | — | — | — | — |
| $C_2H_6$, mol % | 0.32 | — | — | 0.13 | — |
| $C_3H_8$, mol % | 0.03 | — | — | 0.01 | — |

| | ATR mixed feed outlet | MOR syngas outlet | MOR air feed | MOR non-permeate effluent |
|---|---|---|---|---|
| Temperature, °C. | 899.6 | 950.0 | 855.0 | 855.1 |
| Pressure, bara | 34.8 | 34.1 | 1.7 | 1 |
| Total flow, kmol/h | 7348 | 7619.9 | 520.7 | 428 |
| $CH_4$, mol % | 3.22 | 1.32 | — | — |
| $H_2$, mol % | 44.48 | 45.51 | — | — |
| CO, mol % | 13.05 | 14.67 | — | — |
| $CO_2$, mol % | 7.15 | 6.6 | — | — |
| $H_2O$, mol % | 31.42 | 31.24 | — | — |
| $N_2$, mol % | 0.68 | 0.65 | 78.12 | 95.04 |
| $O_2$, mol % | — | — | 20.95 | 3.83 |
| Ar, mol % | — | — | 0.93 | 1.13 |

TABLE 9-continued

Baseline simulation conditions

| | | | | |
|---|---|---|---|---|
| $C_2H_6$, mol % | — | — | — | — |
| $C_3H_8$, mol % | — | — | — | — |

TABLE 10

Simulated 20% degradation of membrane performance

| | Natural gas process feed | $H_2$ feed | Steam feed | ATR mixed feed inlet | ATR $O_2$ feed inlet |
|---|---|---|---|---|---|
| Temperature, °C. | 37.8 | 37.8 | 257.3 | 510.0 | 148.9 |
| Pressure, bara | 39.6 | 39.6 | 44.8 | 36.9 | 41.4 |
| Total flow, kmol/h | 1764.5 | 35.3 | 2582.2 | 4381.9 | 866.7 |
| $CH_4$, mol % | 96.74 | — | — | 38.95 | — |
| $H_2$, mol % | — | 100 | — | 0.81 | — |
| CO, mol % | — | — | — | — | — |
| $CO_2$, mol % | 0.09 | — | — | 0.04 | — |
| $H_2O$, mol % | — | — | 100 | 58.93 | — |
| $N_2$, mol % | 2.82 | — | — | 1.14 | — |
| $O_2$, mol % | — | — | — | — | 100 |
| Ar, mol % | — | — | — | — | — |
| $C_2H_6$, mol % | 0.32 | — | — | 0.13 | — |
| $C_3H_8$, mol % | 0.03 | — | — | 0.01 | — |

| | ATR mixed feed outlet | MOR syngas outlet | MOR air feed | MOR non-permeate effluent |
|---|---|---|---|---|
| Temperature, °C. | 899.6 | 935.1 | 855.0 | 855.1 |
| Pressure, bara | 34.8 | 34.1 | 1.7 | 1 |
| Total flow, kmol/h | 7348 | 7565.2 | 520.7 | 428 |
| $CH_4$, mol % | 3.22 | 1.69 | — | — |
| $H_2$, mol % | 44.48 | 45.40 | — | — |
| CO, mol % | 13.05 | 14.34 | — | — |
| $CO_2$, mol % | 7.15 | 6.72 | — | — |
| $H_2O$, mol % | 31.42 | 31.19 | — | — |
| $N_2$, mol % | 0.68 | 0.66 | 78.12 | 95.04 |
| $O_2$, mol % | — | — | 20.95 | 3.83 |
| Ar, mol % | — | — | 0.93 | 1.13 |
| $C_2H_6$, mol % | — | — | — | — |
| $C_3H_8$, mol % | — | — | — | — |

TABLE 11

Simulation recovery/compensation for degradation of membrane performance.

| | Natural gas process feed | $H_2$ feed | Steam feed | ATR mixed feed inlet | ATR $O_2$ feed inlet |
|---|---|---|---|---|---|
| Temperature, °C. | 37.8 | 37.8 | 257.3 | 510.0 | 148.9 |
| Pressure, bara | 39.6 | 39.6 | 44.8 | 36.9 | 41.4 |
| Total flow, kmol/h | 1764.5 | 35.3 | 2582.2 | 4381.9 | 883.5 |
| $CH_4$, mol % | 96.74 | — | — | 38.95 | — |
| $H_2$, mol % | — | 100 | — | 0.81 | — |
| CO, mol % | — | — | — | — | — |
| $CO_2$, mol % | 0.09 | — | — | 0.04 | — |
| $H_2O$, mol % | — | — | 100 | 58.93 | — |
| $N_2$, mol % | 2.82 | — | — | 1.14 | — |
| $O_2$, mol % | — | — | — | — | 100 |
| Ar, mol % | — | — | — | — | — |
| $C_2H_6$, mol % | 0.32 | — | — | 0.13 | — |
| $C_3H_8$, mol % | 0.03 | — | — | 0.01 | — |

| | ATR mixed feed outlet | MOR syngas outlet | MOR air feed | MOR non-permeate effluent |
|---|---|---|---|---|
| Temperature, °C. | 907.4 | 950.0 | 855.0 | 855.1 |
| Pressure, bara | 34.8 | 34.1 | 1.7 | 1 |
| Total flow, kmol/h | 7397.6 | 7620.2 | 520.7 | 443.9 |
| $CH_4$, mol % | 2.87 | 1.32 | — | — |
| $H_2$, mol % | 44.71 | 45.50 | — | — |
| CO, mol % | 13.32 | 14.67 | — | — |
| $CO_2$, mol % | 7.08 | 6.60 | — | — |
| $H_2O$, mol % | 31.35 | 31.26 | — | — |
| $N_2$, mol % | 0.67 | 0.65 | 78.12 | 91.64 |
| $O_2$, mol % | — | — | 20.95 | 7.27 |
| Ar, mol % | — | — | 0.93 | 1.09 |
| $C_2H_6$, mol % | — | — | — | — |
| $C_3H_8$, mol % | — | — | — | — |

TABLE 12

Comparative Summary of simulations of tables 9-11

| | Table 9 Baseline | Table 10 20% degradation of membrane performance | Table 11 Recovery/comp. for degradation of membrane performance |
|---|---|---|---|
| Syngas Generation and Purity | | | |
| $H_2$ in Syngas Product from MOR, kmol/h | 3467.9 | 3434.3 | 3467.0 |
| CO in Syngas Product from MOR, kmol/h | 1117.7 | 1084.9 | 1117.5 |
| $CO_2$ in Syngas Product from MOR, kmol/h | 502.9 | 508.3 | 503.2 |
| $CH_4$ in Syngas Product from MOR, kmol/h | 100.9 | 128.2 | 100.7 |
| $H_2$ Generation in ATR, kmol/h | 3232.9 | 3232.9 | 3272.4 |
| CO Generation in ATR, kmol/h | 959 | 959.0 | 985.4 |
| $H_2$ + CO Generation in ATR, kmol/h | 4191.9 | 4191.9 | 4257.7 |
| $H_2$ Generation in MOR, kmol/h | 199.7 | 166.1 | 159.3 |
| CO Generation in MOR, kmol/h | 158.7 | 126.0 | 132.2 |
| $H_2$ + CO Generation in MOR, kmol/h | 358.4 | 292.1 | 291.5 |

TABLE 12-continued

Comparative Summary of simulations of tables 9-11

|  | Table 9 Baseline | Table 10 20% degradation of membrane performance | Table 11 Recovery/comp. for degradation of membrane performance |
|---|---|---|---|
| Natural Gas Process Feed, kmol/h | 1764.5 | 1764.5 | 1764.5 |
| $H_2$ Feed, kmol/h | 35.3 | 35.3 | 35.3 |
| Steam Feed, kmol/h | 2582.2 | 2582.2 | 2582.2 |
| $O_2$ Reactant Feed, kmol/h | 866.7 | 866.7 | 883.5 |
| Reactant Feed Mixture Steam-to-Carbon Molar Ratio | 1.5 | 1.5 | 1.5 |
| Reactant Feed Mixture Oxygen-to-Carbon Ratio | 0.504 | 0.504 | 0.513 |
| Air Feed to MOR* System, kmol/h | 520.7 | 520.7 | 520.7 |
| Total $O_2$ Permeation in MOR* System, kmol/h | 92.7 | 71.2 | 76.8 |
| Oxygen Recovery in MOR* System, % | 85 | 65 | 70 |
| Feed Carbon Conversion to CO | 64.9 | 63 | 64.9 |
| $H_2$ + CO contained in Syngas Product, kmol/h | 4585.6 | 4519.2 | 4584.5 |
| Syngas Product $H_2$/CO Ratio | 3.1 | 3.17 | 3.1 |
| Syngas Product Purity, dry mol % $H_2$ + CO | 87.5 | 86.8 | 87.5 |

|  | Table 9 Baseline | Table 10 20% degradation of membrane performance | Table 11 Recovery/comp. for degradation of membrane performance |
|---|---|---|---|
| Reactor Temperatures |  |  |  |
| ATR Mixed Feed, ° C. | 510 | 510 | 510 |
| ATR Effluent, ° C. | 899.6 | 899.6 | 907.4 |
| MOR* Syngas Feed, ° C. | 899.6 | 899.6 | 907.4 |
| Membrane Oxidation Reactor Syngas Effluent, ° C. | 950.0 | 935.1 | 950.0 |
| Syngas Generation and Purity |  |  |  |
| $H_2$ in Mixed Feed to ATR | 35.3 | 35.3 | 35.3 |
| CO in Mixed Feed to ATR | 0 | 0 | 0 |
| $CO_2$ in Mixed Feed to ATR | 1.6 | 1.6 | 1.6 |
| $CH_4$ in Mixed Feed to ATR | 1707 | 1707 | 1707 |
| $C_2H_6$ in Mixed Feed to ATR | 5.6 | 5.6 | 5.6 |
| $C_3H_8$ in Mixed Feed to ATR | 0.5 | 0.5 | 0.5 |
| $H_2$ in Mixed Feed to MOR, kmol/h | 3268.2 | 3268.2 | 3307.6 |
| CO in Mixed Feed to MOR, kmol/h | 959 | 959 | 985.4 |
| $CO_2$ in Mixed Feed to MOR, kmol/h | 525.6 | 525.6 | 524.1 |
| $CH_4$ in Mixed Feed to MOR, kmol/h | 236.8 | 236.8 | 212.0 |

|  | Table 9 Baseline | Table 10 20% degradation of membrane performance | Table 11 Recovery/comp. for degradation of membrane performance |
|---|---|---|---|
| Syngas Generation and Purity |  |  |  |
| $H_2$ in Syngas Product from MOR, kmol/h | 3467.9 | 3434.3 | 3467.0 |
| CO in Syngas Product from MOR, kmol/h | 1117.7 | 1084.9 | 1117.5 |
| $CO_2$ in Syngas Product from MOR, kmol/h | 502.9 | 508.3 | 503.2 |
| $CH_4$ in Syngas Product from MOR, kmol/h | 100.9 | 128.2 | 100.7 |
| $H_2$ Generation in ATR, kmol/h | 3232.9 | 3232.9 | 3272.4 |
| CO Generation in ATR, kmol/h | 959 | 959.0 | 985.4 |
| $H_2$ + CO Generation in ATR, kmol/h | 4191.9 | 4191.9 | 4257.7 |
| $H_2$ Generation in MOR, kmol/h | 199.7 | 166.1 | 159.3 |
| CO Generation in MOR, kmol/h | 158.7 | 126.0 | 132.2 |
| $H_2$ + CO Generation in MOR, kmol/h | 358.4 | 292.1 | 291.5 |

*MOR = Membrane Oxidation Reactor

What is claimed is:

1. A method for producing a synthesis gas product comprising hydrogen and carbon monoxide, comprising the steps of:

(a) reacting a reactant gas mixture comprising steam and a hydrocarbon in a reforming reaction in a primary reformer system to form an intermediate gas mixture having a composition comprising methane, hydrogen, and carbon oxides;

(b) introducing at least a portion of the intermediate gas mixture into a membrane oxidation reactor system comprising a plurality of membrane oxidation reactor stages arranged in series including a first membrane oxidation reactor stage and a second membrane oxidation reactor stage in the series, each stage comprising a membrane oxidation reactor and a catalyst, each membrane oxidation reactor comprising a reactant zone, an oxidant zone, and one or more mixed metal oxide membranes separating the reactant zone from the oxidant zone, wherein all of the intermediate gas mixture that is introduced into the membrane oxidation reactor system is introduced into the reactant zone of the first membrane oxidation reactor stage of the plurality of membrane oxidation reactor stages, and wherein each of the reactant zones of the plurality of membrane oxidation reactor stages has an effluent discharged therefrom, wherein at least a portion of the effluent from the reactant zone of the first membrane oxidation reactor stage is introduced into the reactant zone of the second membrane oxidation reactor stage as a feed thereto, and wherein the feed to the reactant zone of the second membrane oxidation reactor stage consists of the at least a portion of the effluent from the first membrane oxidation reactor stage;

(c) introducing an oxygen-containing oxidant gas mixture into the oxidant zone of each of the plurality of membrane oxidation reactor stages and permeating oxygen through the one or more mixed metal oxide membranes of each of the plurality of membrane oxidation reactor stages;

(d) reacting the at least a portion of the intermediate gas mixture with the oxygen that has permeated through the one or more mixed metal oxide membranes of one or more of the plurality of membrane oxidation reactor stages to form the synthesis gas product;

(e) discharging the synthesis gas product as an effluent from the membrane oxidation reactor system;

(f) measuring the temperature of the synthesis gas product from the membrane oxidation reactor system; and (g) controlling reaction conditions of the primary reformer system as a function of the measured temperature of the synthesis gas product from the membrane oxidation reactor system.

2. The method of claim 1, wherein step (g) comprises:
adjusting an operating temperature of the primary reformer system as a function of the measured temperature of the synthesis gas product from the membrane oxidation reactor system.

3. The method of claim 1, wherein the primary reformer system comprises a fired tubular reformer and step (g) comprises:
adjusting at least one of a flow rate and a composition of combustion fuel to the fired tubular reformer as a function of the measured temperature of the synthesis gas product from the membrane oxidation reactor system.

4. The method of claim 1, wherein the primary reformer system comprises at least one of an oxygen-blown reformer, an auto-thermal reformer, and a partial oxidation reactor, and step (g) comprises:
adjusting a flow rate of oxygen to the primary reformer system as a function of the measured temperature of the synthesis gas product from the membrane oxidation reactor system.

5. The method of claim 1, wherein step (g) comprises:
adjusting at least one of an amount of hydrocarbon contained in the reactant gas mixture, an amount of steam contained in the reactant gas mixture, and a molar ratio of steam-to-carbon contained in the reactant gas mixture.

6. The method of claim 1, wherein step (g) comprises:
controlling reaction conditions of the primary reformer system to maintain the measured temperature of the synthesis gas product from the membrane oxidation reactor system while performance of the one or more mixed metal oxide membranes degrades.

7. The method of claim 1, wherein step (g) comprises:
controlling reaction conditions of the primary reformer system to maintain the measured temperature of the synthesis gas product from the membrane oxidation reactor system while a production rate of synthesis gas product from the membrane oxidation reactor system is reduced.

8. The method of claim 1, wherein step (g) comprises:
controlling reaction conditions of the primary reformer system to maintain the measured temperature of the synthesis gas product from the membrane oxidation reactor system while a production rate of synthesis gas product from the membrane oxidation reactor system is increased.

9. The method of claim 1 wherein the plurality of membrane oxidation reactor stages comprises n membrane oxidation reactor stages, wherein the integer n is greater than or equal to 3, wherein at least a portion of the effluent from the reactant zone of the $(k-1)^{th}$ membrane oxidation reactor stage is introduced into the reactant zone of the $k^{th}$ membrane oxidation reactor stage as a feed thereto where k takes on each integer value from 3 to n, and wherein the feed to the reactant zone of the $k^{th}$ membrane oxidation reactor stage consists of the at least a portion of the effluent from the $(k-1)^{th}$ membrane oxidation reactor stage for each integer k, the $k^{th}$ membrane oxidation reactor stage being arranged serially directly downstream of the $(k-1)^{th}$ membrane oxidation reactor stage.

10. The method of claim 1, wherein the primary reformer system comprises a fired tubular reformer.

11. The method of claim 1, wherein the primary reformer system comprises at least one of an oxygen-blown reformer, an auto-thermal reformer, and a partial oxidation reactor.

12. The method of claim 1 wherein at least one of:
(i) the primary reformer system is operated such that the composition of the intermediate gas mixture is essentially at chemical equilibrium with respect to the steam reforming reaction; and
(ii) the primary reformer system is operated such that the composition of the at least a portion of the intermediate gas mixture that is introduced into the membrane oxidation reactor system is essentially at chemical equilibrium with respect to the steam reforming reaction.

13. The method of claim 1, wherein the membrane oxidation reactor system is operated such that the composition of the synthesis gas product from the membrane oxidation reactor system is essentially at chemical equilibrium with respect to the steam reforming reaction.

14. The method of claim 1, further comprising:
(f) determining a target operating temperature value for the intermediate gas mixture as a function of a measured temperature of the synthesis gas product from the membrane oxidation reactor system; and
(g) controlling reaction conditions of the primary reformer system as a function of the target operating temperature value for the intermediate gas mixture.

\* \* \* \* \*